(12) United States Patent  
Miura

(10) Patent No.: US 7,055,001 B2  
(45) Date of Patent: May 30, 2006

(54) STORAGE ARRAY CONTROLLER WITH A NONVOLATILE MEMORY AS A CACHE MEMORY AND CONTROL METHOD OF THE SAME

(75) Inventor: Sumihiro Miura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 10/809,465

(22) Filed: Mar. 26, 2004

(65) Prior Publication Data

US 2005/0177680 A1    Aug. 11, 2005

(30) Foreign Application Priority Data

Feb. 6, 2004    (JP)    .............................. 2004-030825

(51) Int. Cl.  
*G06F 12/00*    (2006.01)

(52) U.S. Cl. .................. 711/133; 711/111; 711/112

(58) Field of Classification Search ................ 711/133, 711/111, 112  
See application file for complete search history.

(56) References Cited

U.S. PATENT DOCUMENTS

| 5,552,776 A | 9/1996 | Wade et al. |
| 5,935,244 A | 8/1999 | Swamy et al. |
| 6,289,397 B1 | 9/2001 | Tsuyuguchi et al. |
| 2003/0097508 A1* | 5/2003 | Aneshansley ............... 710/302 |
| 2004/0143688 A1 | 7/2004 | Sugimoto |

FOREIGN PATENT DOCUMENTS

JP    11-203201    1/1998

* cited by examiner

*Primary Examiner*—Stephen C. Elmore  
(74) *Attorney, Agent, or Firm*—Reed Smith LLP; Stanley P. Fisher, Esq.; Juan Carlos A. Marquez, Esq.

(57) ABSTRACT

To receive a data input/output request from an information processor and writing data in a hard disk drive in accordance with the data input/output request, a storage array controller is provided with a circuit board having a nonvolatile memory functioning as a cache memory for storing the data to be read from or written in the hard disk drive and a circuit board mounting assembly to which the circuit board is removably mounted and in which the circuit board is provided with a removal information output circuit for outputting the circuit board removal information indicating that the circuit board is removed from the circuit board mounting assembly and a data erase circuit for erasing the data stored in the nonvolatile memory when the circuit board removal information is output from the removal information output circuit.

13 Claims, 15 Drawing Sheets

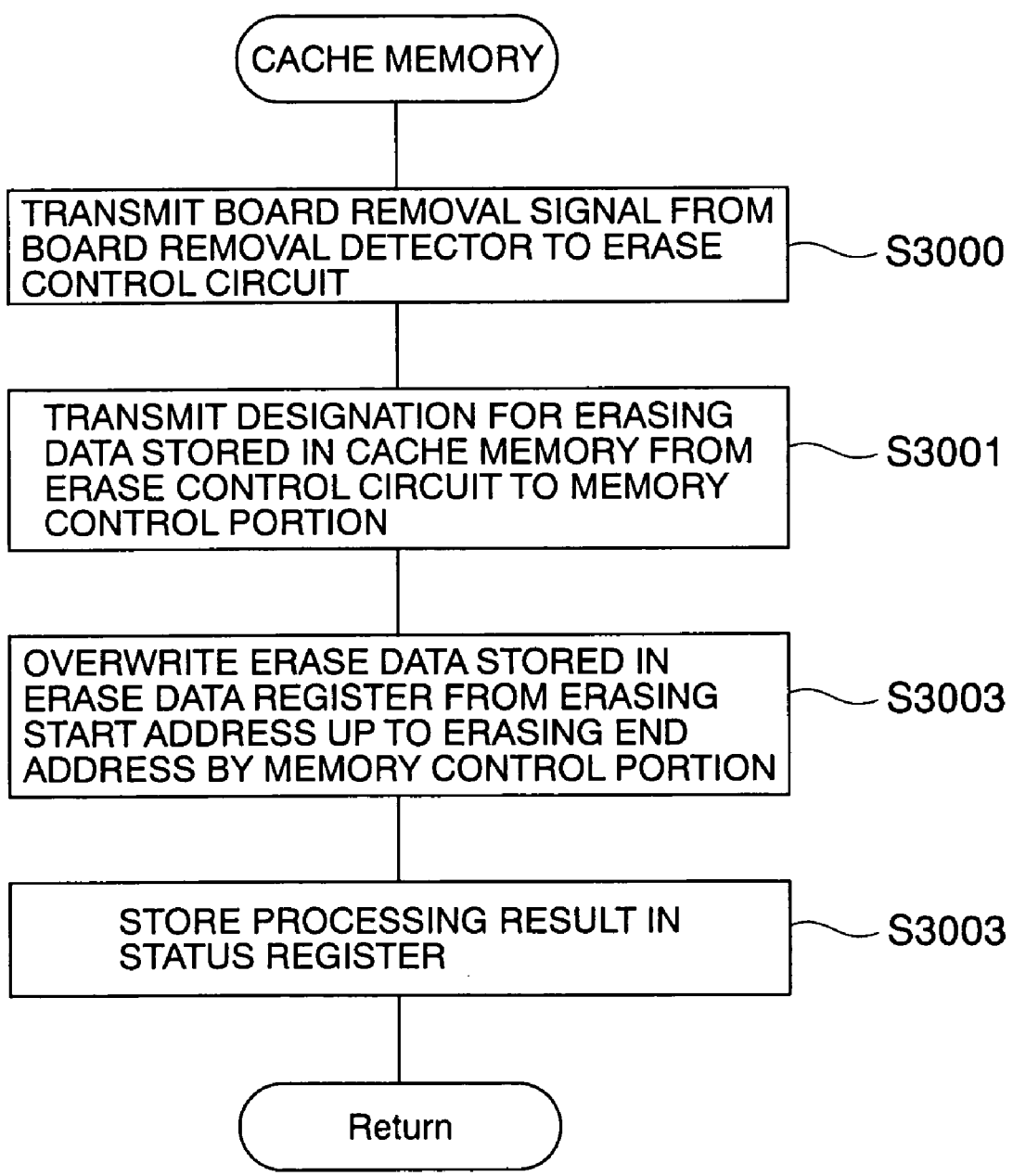

STORAGE ARRAY CONTROLLER WITH A NONVOLATILE MEMORY AS A CACHE MEMORY AND CONTROL METHOD OF THE SAME

BACKGROUND OF THE INVENTION

The present invention relates to a storage controller and a control method of the storage controller.

A storage controller reads or writes data from or in a hard disk drive in accordance with a data input/output request transmitted from an information processor. Moreover, the storage controller is provided with a cache memory for storing the data to be read from or written in the hard disk drive and thereby, a response to the data input/output request from the information processor is accelerated.

JP-A-11-203201 is a document relating to the present invention.

The cache memory frequently uses a volatile memory such as an SDRAM (Synchronous Dynamic Random Access Memory). In this case, however, when supply of power to the cache memory is stopped, the data stored in the cache memory disappears. Therefore, it is necessary to prepare a spare power unit such as a battery for a storage controller so that the data stored in the cache memory does not disappear even when supply of power to the cache memory is stopped due to power failure.

Therefore, it is considered to use a nonvolatile memory such as a flash EEPROM (Electrically Erasable and Programmable Read Only Memory) for a cache memory. In this case, however, though the data stored in the cache memory does not disappear even if supply of power to the cache memory is stopped, the data is stored in the cache memory in the state at that time even if the cache memory is removed from a storage controller. Therefore, it is necessary to prevent the data stored in the cache memory from leaking.

SUMMARY OF THE INVENTION

The present invention is made to solve the above problem and its main object is to provide a storage controller and a control method of the storage controller.

To solve the above problem, the present invention uses a storage controller for receiving a data input/output request from an information processor to read or write data from or in a hard disk drive in accordance with the data input/output request, which is provided with a circuit board having a nonvolatile memory functioning as a cache memory for storing the data to be read or written from or in the hard disk drive and a circuit board setting portion to which the circuit board is removably set and in which the circuit board is provided with a removal information output circuit for outputting circuit board removal information showing that the circuit board is removed from the circuit board setting portion and a data erase circuit for erasing the data stored in the nonvolatile memory when the circuit board removal information is output from the removal information output circuit.

Moreover, problems disclosed by the present application and their solving method will be made apparent from the section of description of the preferred embodiment and accompanying drawings.

Other objects, features and advantages of the invention will become apparent from the following description of the embodiments of the invention taken in conjunction with the accompanying drawings.

BRIEF DESCRIPTION OF THE DRAWINGS

FIG. 19 is a flowchart showing the processing for erasing the data stored in the cache memory of the present embodiment.

DESCRIPTION OF THE EMBODIMENTS

It is possible to provide a storage controller and a control method of the storage controller.

GENERAL CONFIGURATION EXAMPLE

Figure 1:
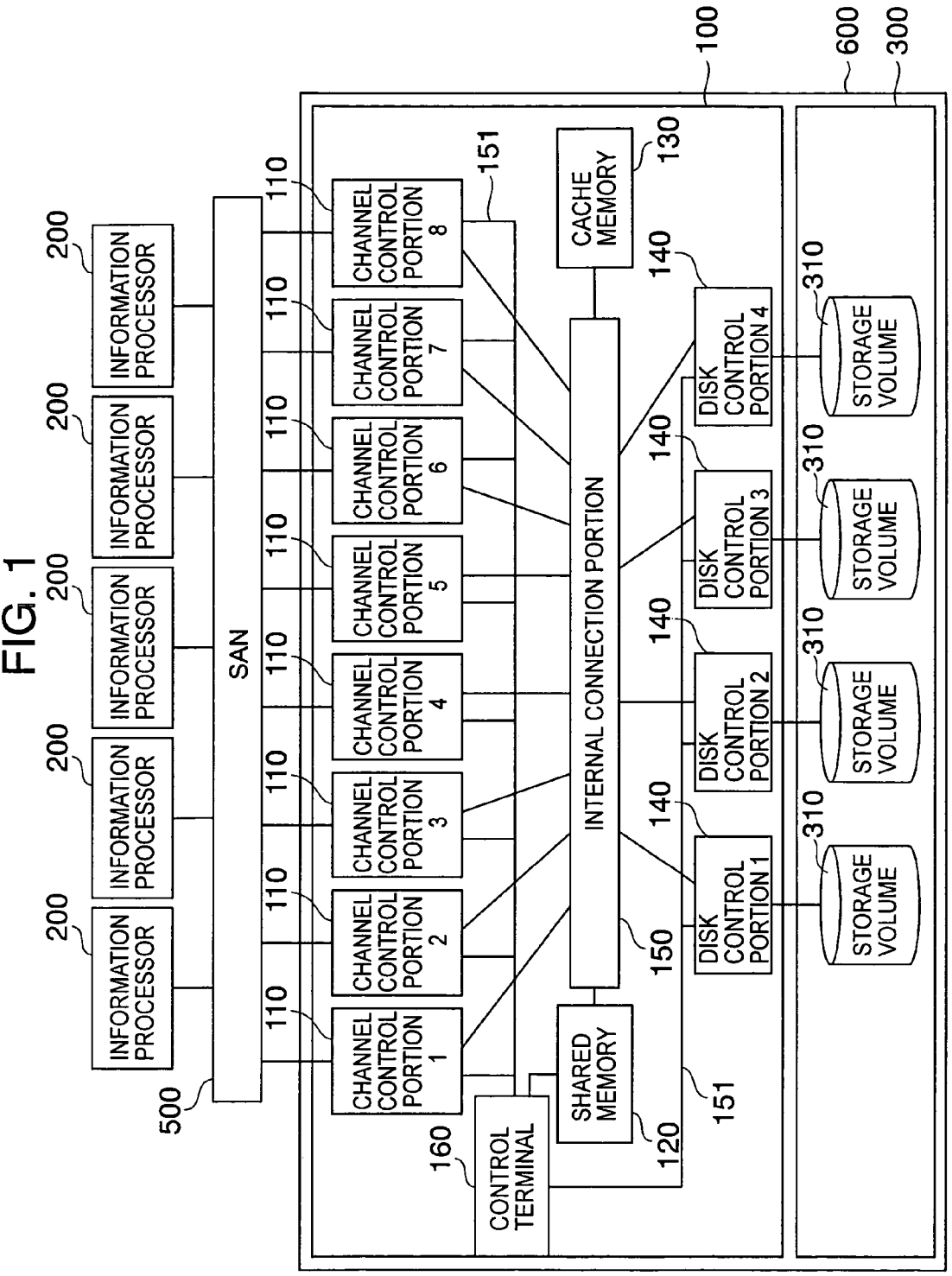
FIG. 1 is a block diagram showing a general configuration of a storage unit of the present embodiment.

First, FIG. 1 shows a block diagram showing the general configuration of a storage unit 600 including a storage controller 100 of this embodiment.

The storage unit 600 is provided with the storage controller 100 and a storage drive 300. The storage controller 100 receives a data input/output request from an information processor 200 to read or write data from or in a hard disk drive for storing the data stored in the storage drive 300 in accordance with the data input/output request.

Each information processor 200 is an information technology device such as a computer provided with a CPU (Central Processing Unit) and a memory. Various programs are executed by CPUs of the information processors 200 and thereby, various functions are realized. Each information processor 200 is used as a central computer in an automatic teller machine of a bank or a seat reservation system of an airplane. Moreover, each information processor 200 can be used as a personal computer, workstation, or a main frame computer.

The storage controller 100 is communicably connected with each information processor 200 through or not through a SAN (Storage Area Network) 500. Communication between each information processor 200 and the storage controller 100 performed through the SAN 500 is performed in accordance with a fiber channel protocol. In this case, the SAN 500 includes a communication unit, such as at least one switch conforming to the fiber channel protocol. Moreover, a data input/output request is transmitted to the storage controller 100 from each information processor 200 in accordance with the fiber channel protocol.

However, rather than including the SAN 500, it is also possible to perform the communication between each information processor 200 and the storage controller 100 through a main-frame-based communication protocol such as FICON (Fibre Connection) (registered trade mark) or ESCON (Enterprise System Connection) (registered trade mark) or in accordance with a communication protocol such as TCP/IP (Transmission Control Protocol/Internet Protocol).

Storage Volume

The storage drive 300 is provided with a plurality of hard disk drives. Moreover, the storage drive 300 reads or writes data from or in storage volumes 310. The storage volumes 310 includes physical volumes serving as physical storage areas which are provided by these hard disk drives and logical volumes serving as storage areas physically set on the physical volumes to store data.

Furthermore, it is possible to constitute the storage drive 300 of a disk array by a plurality of hard disk drives. In this case, it is also possible that storage areas provided for the information processors 200 are provided by a plurality of hard disk drives controlled by RAID (Redundant Arrays of Inexpensive Disks).

It is also possible to directly connect the storage controller 100 with the storage drive 300 not through a network as shown in FIG. 1 or through a network. Moreover, it is possible to constitute the storage drive 300 integrally with the storage controller 100.

Storage Controller

The storage controller 100 is provided with channel control portions 110, a shared memory 120, a cache memory 130, disk control portions 140, a control terminal 160, and an internal connection portion 150.

Each channel control portion or adapter 110 is defined as a device provided with a communication interface for communicating with each information processor 200 and has a function for receiving a data input/output request from each information processor 200 and for transferring data to and from each information processor 200. Moreover, the portion 110 outputs an I/O request corresponding to the data input/output request received from the information processor. The I/O request is a command for reading or writing data in accordance with a data input/output request received from each information processor 200 by the storage unit 600.

The channel control portions or adapters 110 are defined as devices connected by an internal LAN 151 together with the control terminal 160. Thereby, it is possible to transmit a microprogram to be executed by each channel control portion 110 from the control terminal 160 to install it. By transmitting various commands to the channel control portions 110 from the control terminal 160, it is also possible to make the channel control portions 110 perform various controls according to the various commands. For example, as to be described later, it is possible to transmit a command for erasing the data stored in the cache memory 130 to each channel control portion 110 from the control terminal 160 to make the channel control portion 110 erase the data stored in the cache memory 130. The configuration of each channel control portion 110 will be described later.

The internal connection portion or connector 150 is defined as a device mutually connects the channel control portions 110, shared memory 120, cache memory 130, and disk control portions 140. It is also possible that the control terminal 160 will be connected. Data or commands are exchanged between the channel control portions 110, shared memory 120, cache memory 130, and disk control portions 140 through the internal connection portion 150. The internal connection portion 150 is constituted by, for example, a crossbar switch.

The shared memory 120 and cache memory 130 are memories shared by the channel control portions 110 and disk control portions 140. The shared memory 120 mainly stores control information and I/O requests while the cache memory 130 is used to mainly store the data to be exchanged between the channel control portions 110 and disk control portions 140 and to be stored in a hard disk drive.

For example, when a data input/output request received from each information processor 200 by a certain channel control portion 110 is a data write request, the channel control portion 110 writes an I/O request corresponding to the data write request in the shared memory 120 and the write data received from each information processor 200 in the cache memory 130. Moreover, each channel control portion 110 transmits the status information showing that data write is completed to each information processor 200. Moreover, each disk control portion 140 monitors the shared memory 120. When the disk control portion 140 detects that the I/O request corresponding to the data write request is written in the shared memory 120, it reads write data from the cache memory 130 in accordance with the I/O request and writes the data in the storage drive 300.

Moreover, when a data input/output request received from each information processor 200 by a certain channel control portion 110 is a data read request, the channel control portion 110 checks whether the data to be read is present in the cache memory 130. In this case, when the data is present in the cache memory 130, the channel control portion 110 transmits the data to the information processor 200. However, when the data to be read is not present in the cache memory 130, the channel control portion 110 writes the I/O request corresponding to the data read request in the shared memory 120 and monitors the shared memory 120. Each disk control portion or adapter 140 is defined as a device which detects that the I/O request corresponding to the data read request which is written in the shared memory 120. The disk control portion 140 reads the data from the storage drive 300 and writes the data in the cache memory 130, and moreover writes the fact of writing the data in the cache memory 130 in the shared memory 120. Moreover, when detecting that the data to be read is written in the cache memory 130, the channel control portion 110 transmits the data to the information processor 200.

Thus, the data to be stored in the hard disk drive is transmitted between each channel control portion 110 and each disk control portion 140 through the cache memory 130. It is also possible to integrally form the cache memory 130 and shared memory 120. The configuration of the cache memory 130 will be described later.

Moreover, it is possible to use a configuration to write data in each disk control portion 140 from each channel control portion 110, or to read data from the channel control portion 110 to the disk control portion 140 through the shared memory 120, or a configuration to write data in each disk control portion 140 from each channel control portion 110, or to read data from the channel control portion 110 to the disk control portion 140 not through the shared memory 120.

The channel control portion 110 having the disk control portion 140 allows itself to perform reading/writing of data stored in the storage drive 300.

The disk control portions 140 are communicably connected with the storage drive 300 to read or write the data stored in the hard disk drive storing data. For example, as described above, the portions 140 read or write data from or in the storage volume 310 in accordance with an I/O request stored in the shared memory 120.

The disk control portions 140 are connected by the internal LAN 151 together with the control terminal 160 so as to be able to communicate with each other. Thereby, it is possible to transmit a program to be executed by each disk control portion 140 from the control terminal 160 and install the program. Various commands sent from the control terminal 160 to the disk control portion 140 allows the disk control portion 140 to perform various types of control. Moreover, it is possible to transmit a command for erasing the data stored in the cache memory 130 to the disk control portions 140 from the control terminal 160 to make the disk control portions 140 erase the data stored in the cache memory 130. The configuration of the disk control portions 140 will be described later.

It is already described that the shared memory 120 and cache memory 130 are set independently of the channel control portions 110 and disk control portions 140 in the case of this embodiment. However, this embodiment is not restricted to the above case. It is also preferable that the shared memory 120 or cache memory 130 is distributed to the channel control portions 110 and disk control portions 140. In this case, the internal connection portion 150 mutually connects the channel control portions 110 and disk control portions 140 respectively having the distributed shared memory 120 or cache memory 130.

Control Terminal

The control terminal 160 is defined as a device which serves as an information unit such as a computer for maintaining and controlling the storage unit 600. By operating the control terminal 160, an operator can set a configuration of a hard disk drive in the storage drive 300, set a path serving as a communication route between each information processor 200 and each channel control portion 110, set each storage volume 310, and install a microprogram to be executed in each channel control portion 110 or disk control portion 140. Setting and control of them can be performed by a user interface of the control terminal 160 or a user interface of each information processor 200 or the like for displaying a web page supplied from a web server to be operated by the control terminal 160.

It is possible to constitute the control terminal 160 so as to be built in the storage controller 100, to be externally provided, to serve as a computer for exclusively maintaining and controlling the storage unit 600, or to provide maintaining and controlling functions for a general purpose computer.

Figure 4:
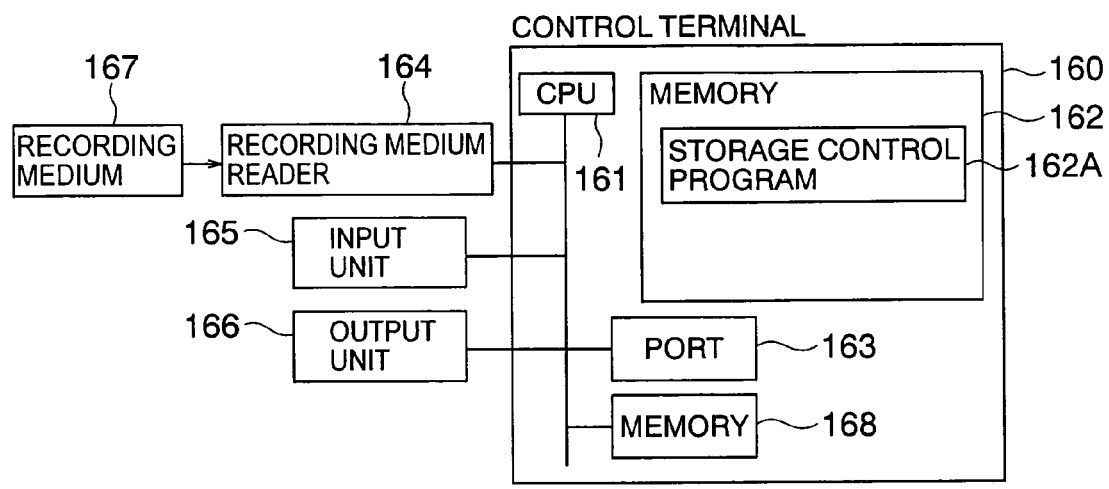
FIG. 4 is a block diagram showing a configuration of a control unit of the present embodiment.

FIG. 4 is a block diagram showing a configuration of the control terminal 160.

The control terminal 160 is provided with a CPU 161, memory 162, port 163, recording medium reader 164, input unit 165, output unit 166, and memory 168.

The CPU 161 controls the whole of the control terminal 160 and executes a storage control program 162A constituted by codes for performing various operations stored in the memory 162. Thereby, it is possible to provide the maintaining and controlling functions of the storage unit 600. Moreover, by executing the storage control program 162A, it is possible to realize the function of the above web server.

The recording medium reader 164 is a device for reading programs and data recorded in a recording medium 167. Read programs and data are stored in a memory 162 or 168. Therefore, it is possible to read the storage control program 162A recorded in the recording medium 167 from the recording medium 167 by using the recording medium reader 164 and store the program 162A in the memory 162 or 168. The recording medium 167 can use a flexible disk, CD-ROM, or semiconductor memory. It is possible to constitute the recording medium reader 164 so as to be built in the control terminal 160 or to be externally set. The memory 168 is a hard disk drive or semiconductor memory. The input unit 165 is a user interface used for an operator to input data to the control terminal 160. The input unit 165 uses a keyboard or mouse. The output unit 166 is a user interface used to output information to an external unit. The output unit 166, defined as a socket or logical channel uses a display or printer. The port 163 is connected to the internal LAN 151 and thereby, the control terminal 160 can communicate with the channel control portions 110 and the disk control portions 140. Moreover, the port 163 is communicably connected with a LAN. In this case, the control terminal 160 can communicate with each information process 200 through the LAN.

Outline View

Figure 2:
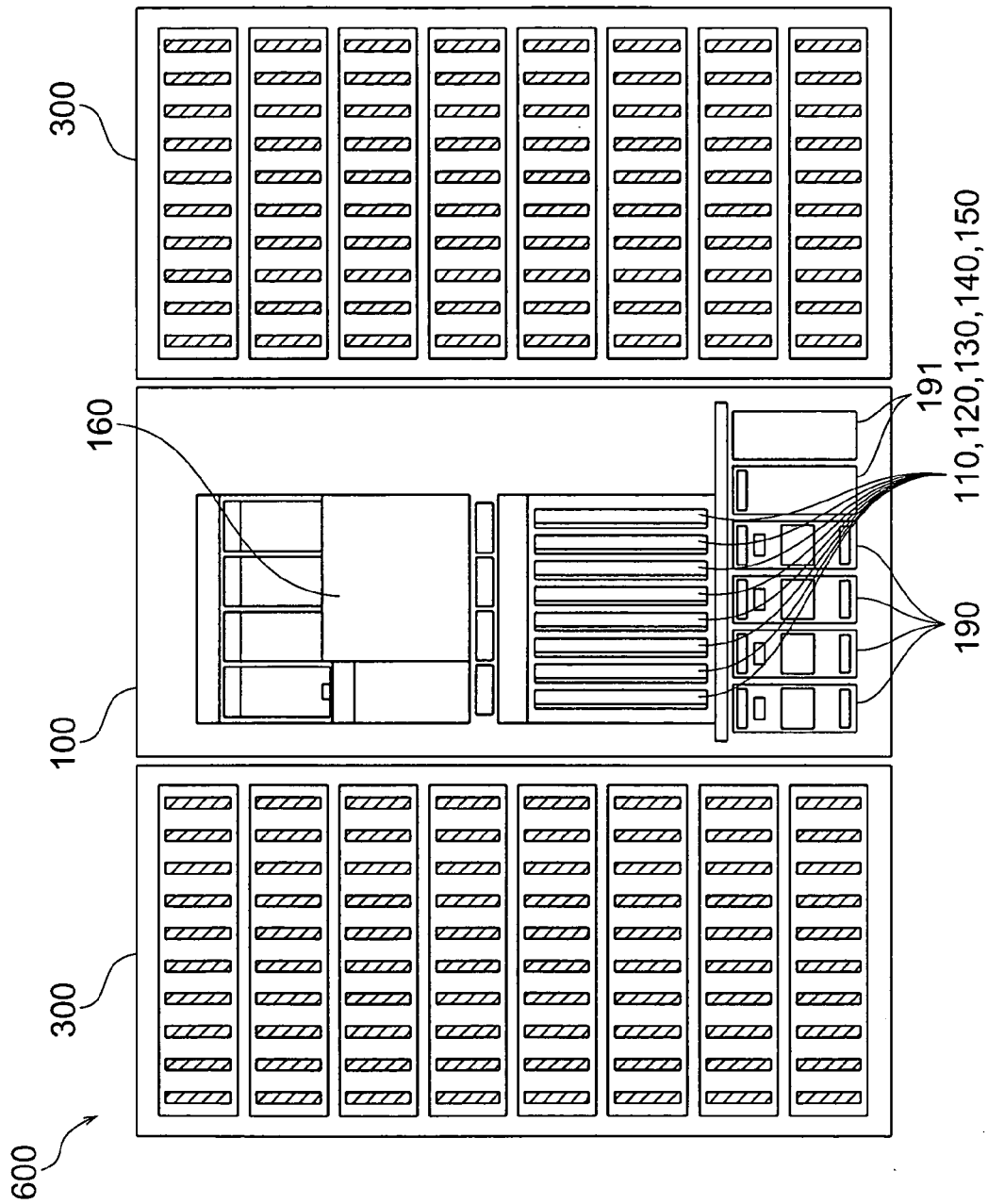
FIG. 2 is an illustration showing an external configuration of the storage unit of the present embodiment.
Figure 3:
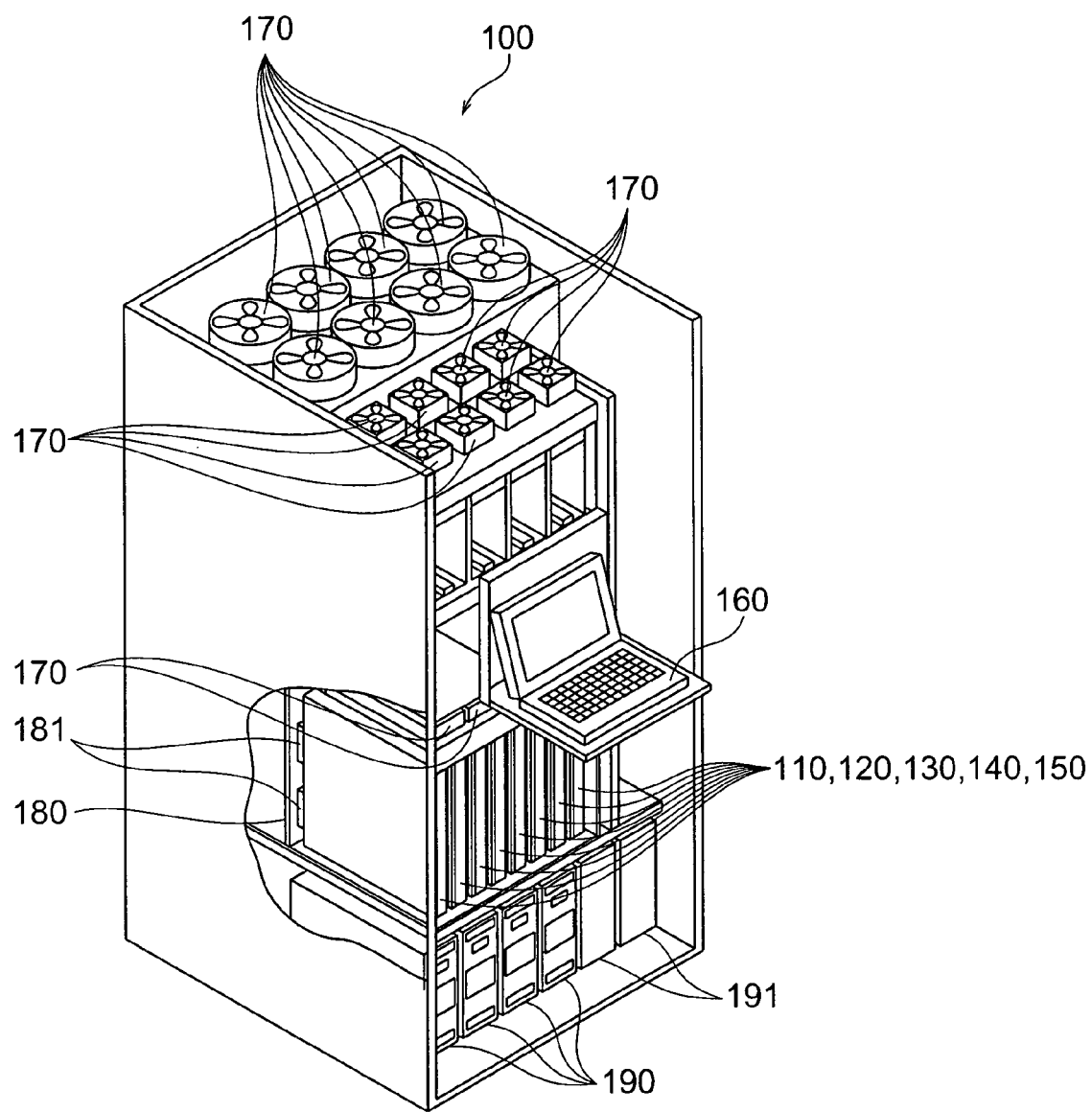
FIG. 3 is an illustration showing an external configuration of a storage controller of the present embodiment.

FIG. 2 shows an outline configuration of the storage unit 600 of this embodiment. FIG. 3 shows an outline configuration of the storage controller 100.

As shown in FIG. 2, the storage unit 600 of this embodiment is constituted so that the storage controller 100 and storage drive 300 are respectively set in a housing. In the case of the example shown in FIG. 2, the housing of the storage drive 300 is set to the both sides of the housing of the storage controller 100. A lot of hard disk drives are arranged and set in the storage drive 300.

In the case of the storage controller 100, the control terminal 160 is set to the front central portion. The control terminal 160 is covered with a cover. As shown in FIG. 3, by opening the cover, it is possible to use the control terminal 160. Though the control terminal 160 shown in FIG. 3 has a conformation of the so-called notebook-type personal computer, it is possible to form the control terminal 160 into any conformation.

The following slots are formed at the bottom of the control terminal 160: a slot to which a circuit board (first circuit board) with the channel control portions 110 formed on it will be set, a slot to which a circuit board (third circuit board) with the disk control portions 140 formed on it will be set, and a slot to which a circuit board (fourth circuit board) having a nonvolatile memory functioning as the cache memory 130 will be set, a slot to which a circuit board (second circuit board) with the shared memory 120 formed on it will be set, and a slot to which a circuit board with the internal connection portion 150 formed on it will be set. A guide rail for setting each of the circuit boards is formed on each slot. By inserting each circuit board into a slot along the guide rail, it is possible to set the circuit boards on which the channel control portions 110, disk control portions 140, cache memory 130, shared memory 120, and internal connection portion 150 are formed to the storage controller 100. The inner part end of each slot is provided with a logic board (circuit board mounting assembly) 180 to which each circuit board will be removably set. The logic board 180 is provided with a connector 181 for electrically connecting each circuit board with the storage controller 100.

Moreover, the storage controller 100 is provided with a fan 170 for radiating the heat generated by the channel control portions 110 or the like. The fan 170 is set on the upside of the storage controller 100 and also set to the upside of each slot.

A power unit 190 and battery 191 are set to the lower stage of the storage controller 100. The power unit 190 is a unit for receiving power from the outside of the storage unit 600 and supplying the power to various units in the storage unit 600 such as the channel control portions 110, cache memory 130, and fan 170. The battery 191 is a spare power unit for supplying power to various units in the storage unit 600 such as the channel control portions 110 and disk control portions 140 instead of the power unit 190 when a power failure occurs or a trouble occurs in the power unit 190.

Because the storage controller 100 of this embodiment uses a nonvolatile memory as the cache memory 130, it is not necessary to supply power to the cache memory 130 when a power failure occurs or a trouble occurs in the power unit 190. Therefore, it is possible to downsize the spare power unit. Thereby, it is possible to downsize the storage controller 100.

Channel Control Portion

Figure 5:
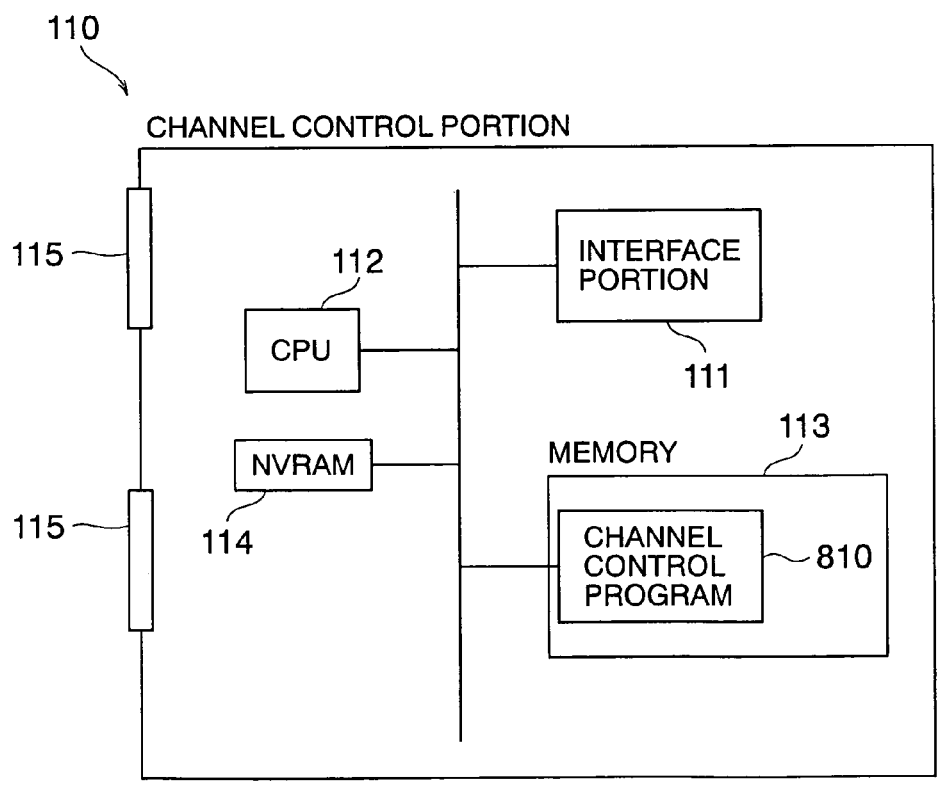
FIG. 5 is a block diagram showing a configuration of a channel control portion of the present embodiment.

FIG. 5 shows a configuration of a channel control portion 110.

A circuit board having the channel control portion 110 is constituted as a board formed into a unit. That is, the circuit board having the channel control portion 110 is constituted as a board formed into a unit including one or more circuit boards. An interface portion 111, memory 113, CPU 112, NVRAM (NonVolatile Random Access Memory) 114, and connector 115 are formed on the circuit board.

The interface portion or interface 111 is defined as a device which includes a communication interface for communicating with each information processor 200, communication interface for communicating with the control terminal 160, and communication interface for communicating with the shared memory 120, cache memory 130, and disk control portion 140 through the internal connection portion 150.

The CPU 112 controls all the channel control portions 110. When a channel control program 810 constituted by codes stored in the memory 113 to perform various operations and various programs stored in the NVRAM 114 are executed by the CPU 112, functions of the channel control portions 110 of this embodiment are realized.

The NVRAM 114 is a nonvolatile memory for storing a program for controlling the CPU 112. It is possible to write or rewrite contents of the program stored in the NVRAM 114 in accordance with a designation from the control terminal 160.

Each channel control portion 110 is provided with the connector 115. When the connector 115 is fitted to the connector 181 of the logic board 180, the channel control portion 110 is electrically connected with the internal connection portion 150 and control terminal 160 of the storage controller 100.

The memory 113 stores the channel control program 810. The channel control program 810 is a program for performing input/output control of the data stored in each storage volume 310 in accordance with a data input/output request transmitted from each information processor 200, control of the communication with the control terminal 160, and control of erasing the data stored in the cache memory 130 to be described later. It is also possible to constitute the channel control program 810 by a plurality of programs.

Disk Control Portion

Figure 6:
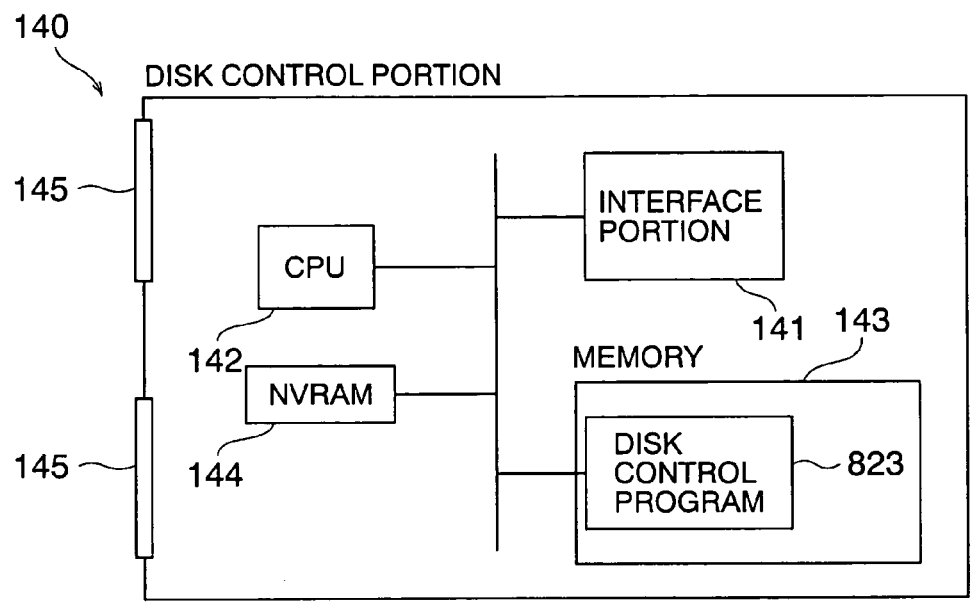
FIG. 6 is a block diagram showing a configuration of a disk control portion of the present embodiment.

FIG. 6 is an illustration showing a configuration of a disk control portion 140.

A circuit board having the disk control portion 140 is constituted as a board formed into a unit. That is, the circuit board having the disk control portion 140 is constituted as a board formed into a unit including one or more circuit boards. The following are formed on the circuit board: an interface portion 141, memory 143, CPU 142, NVRAM 144, and connector 145.

The interface portion 141 is provided with a communication interface for communicating with the control terminal 160, communication interface for communicating with each channel control portion 110 and cache memory 130 through the internal connection portion 150, and a communication interface for communicating with the storage drive 300.

The CPU 142 controls all the disk control portions 140. When a disk control program 820 constituted by codes stored in the memory 143 by the CPU 142 to perform various operations and various programs stored in the NVRAM 144 are executed, functions of the disk control portion 140 of this embodiment are realized.

The NVRAM 144 is a nonvolatile memory for storing a program for controlling the CPU 142. It is possible to write or rewrite the contents of the program stored in the NVRAM 144 in accordance with a designation by the control terminal 160.

Moreover, the disk control portion 140 is provided with the connector 145. When the connector 145 is fitted to the connector 181 of the logic board 180, the disk control portion 140 is electrically connected with the internal connection portion 150 and control terminal 160 of the storage controller 100.

The memory 143 stores the disk control program 820. The disk control program 820 is a program for controlling input/output of the data stored in the storage volumes 310 in the storage drive 300, communication with the control terminal 160, and erasing of the data stored in the cache memory 130 to be described later. It is also possible to constitute the disk control program 820 by a plurality of programs.

Information Processor

Figure 7:
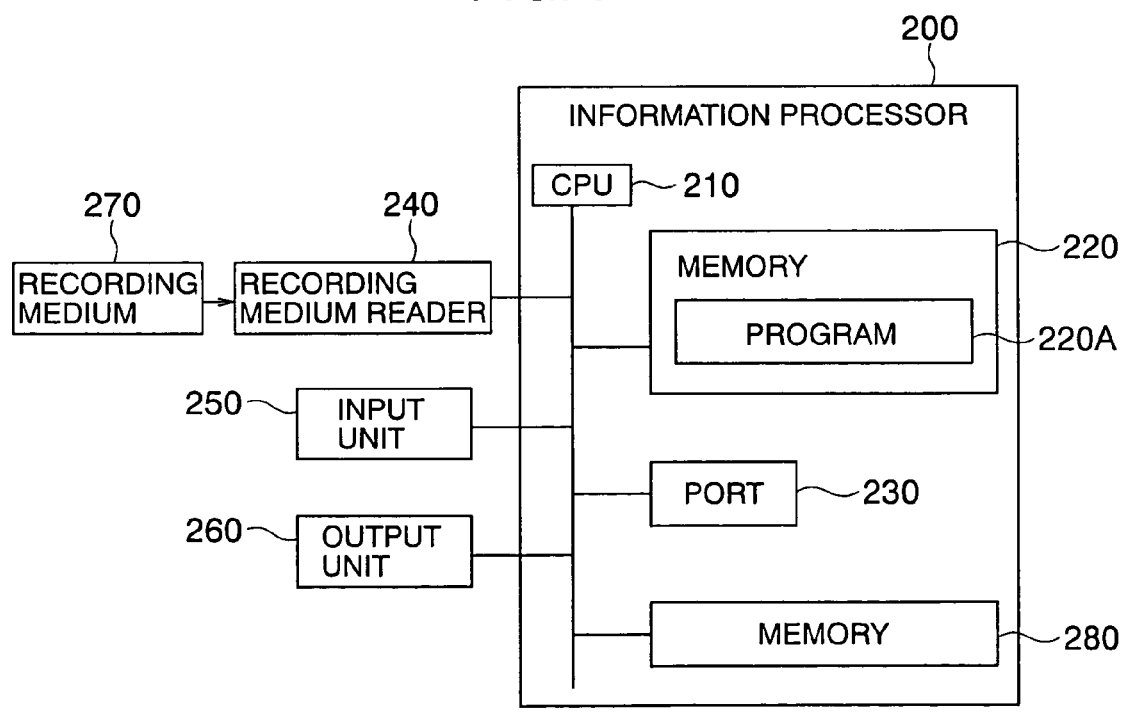
FIG. 7 is a block diagram showing a configuration of an information processor of the present embodiment.

FIG. 7 is a block diagram showing a configuration of each information processor 200 of this embodiment.

Each information processor 200 is provided with a CPU 210, memory 220, port 230, recording medium reader 240, input unit 250, output unit 260, and memory 280.

The CPU 210 controls all the information processors 200. Various functions of this embodiment are realized by executing a program 220A constituted by codes stored in the memory 220 to perform various operations. For example, information processing service such as the above-described automatic teller machine service of a bank is provided when the CPU 210 executes the program 220A. Moreover, when the CPU 210 executes the program 220A, it is possible to display a web page provided by a web server to be operated by the control terminal 160, change configurations of a hard disk drive, set a path serving as a communication route between each information processor 200 and each channel control portion 110, and set the storage volumes 310.

The recording medium reader 240 is a unit for reading the programs and data stored in a recording medium 270. The read programs and data are stored in the memory 220 or 280. Therefore, it is possible to read the program 220A from the recording medium 270 by using the recording medium reader 240 and store the program 220A in the memory 220 or 280. The recording medium 270 can use a flexible disk, CD-ROM, or semiconductor memory. It is possible to constitute the recording medium reader 240 so as to be built in each information processor 200 or to be externally set. It is possible to use the memory 280 as a hard disk drive or a semiconductor memory. Moreover, it is possible to constitute the memory 280 so as to be built in each information processor 200 or to be externally set. When the memory 280 is externally set, it is possible to use the memory 280 as the memory 280 of another information processor 200 connected through a communication network. Furthermore, it is possible to use the memory 280 as a storage unit 600. The input unit 250 is a user interface used to input data to each information process 200 by an operator of the information processor 200. The input unit 250 can use a keyboard or mouse. The output unit 260 is a user interface for outputting information to an external unit. The output unit 260 can use a display or printer. The port 230 is a unit for communicating with each channel control portion 110. It is also possible to constitute the port 230 so as to be able to communicate with another information processor 220 or the control terminal 160 through a communication network such as a LAN. In this case, it is also possible to constitute the port 230 so as to be able to receive the program 220A from another information processor 200 through the port 230 and store the program 220A in the memory 220 or 280.

Cache Memory

Figure 9:
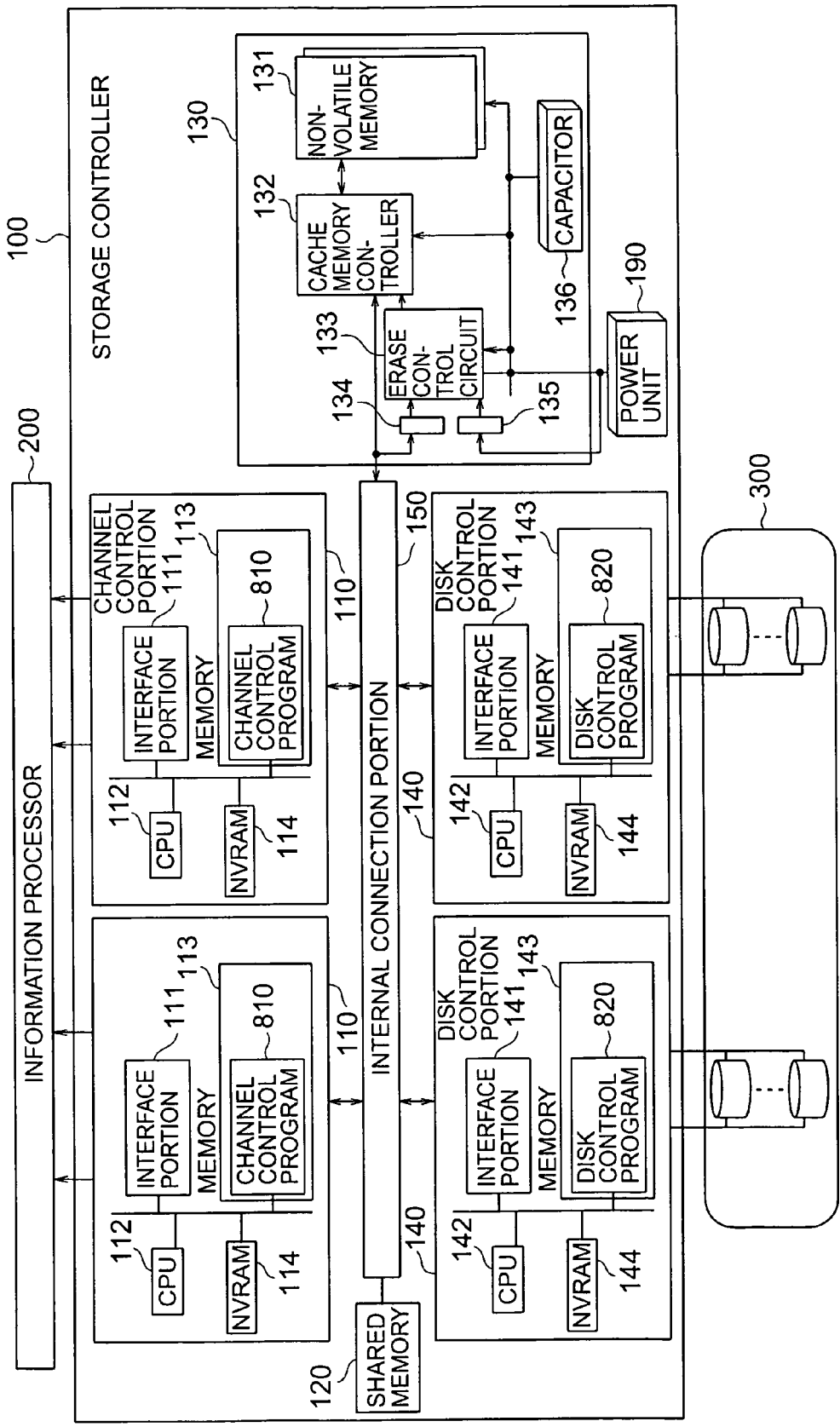
FIG. 9 is a block diagram showing a configuration of the storage controller of the present embodiment.
Figure 10:
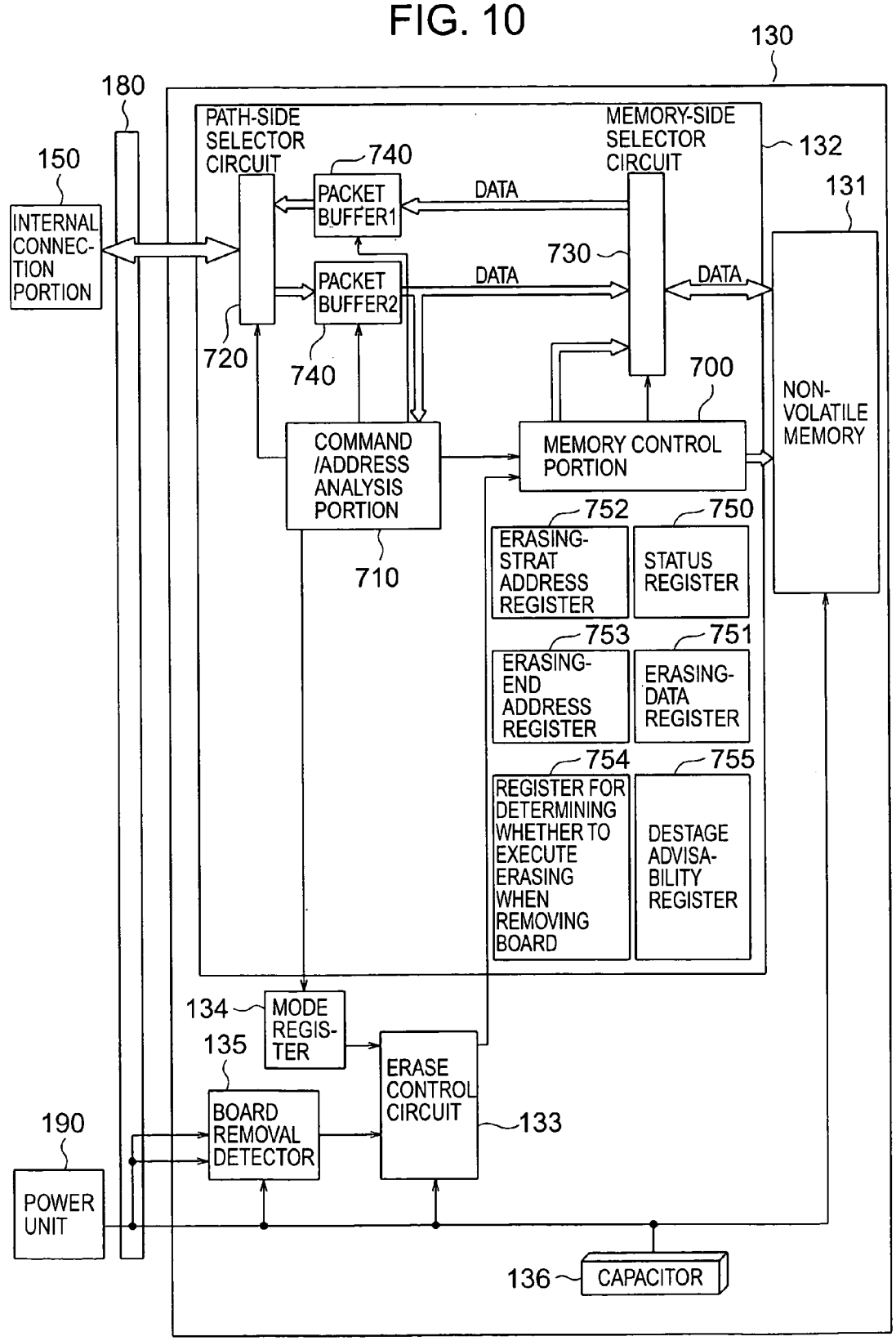
FIG. 10 is a block diagram showing a configuration of a cache memory of the present invention.
Figure 14:
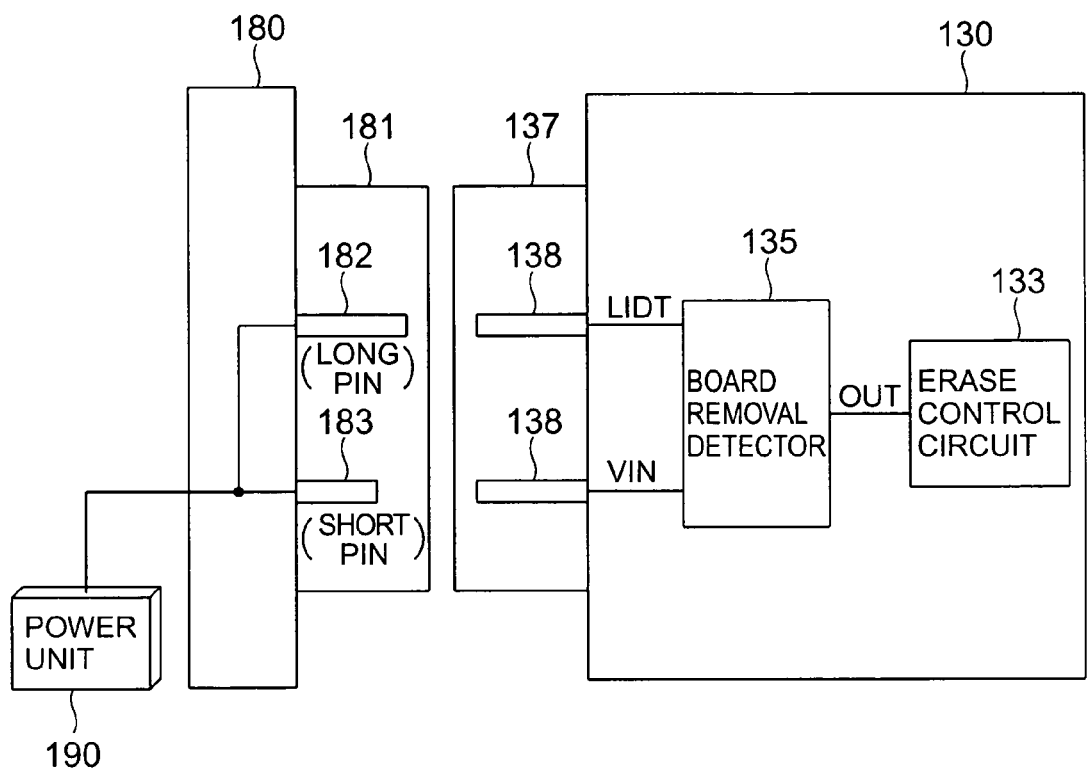
FIG. 14 is a block diagram showing a configuration of a cache memory of the present embodiment.

FIGS. 9, 10, and 14 show configurations of the cache memory 130 of this embodiment.

FIG. 9 shows a configuration of the cache memory 130 in the storage controller 100 of this embodiment. FIG. 10 shows a detailed configuration of the cache memory 130.

Figure 8:
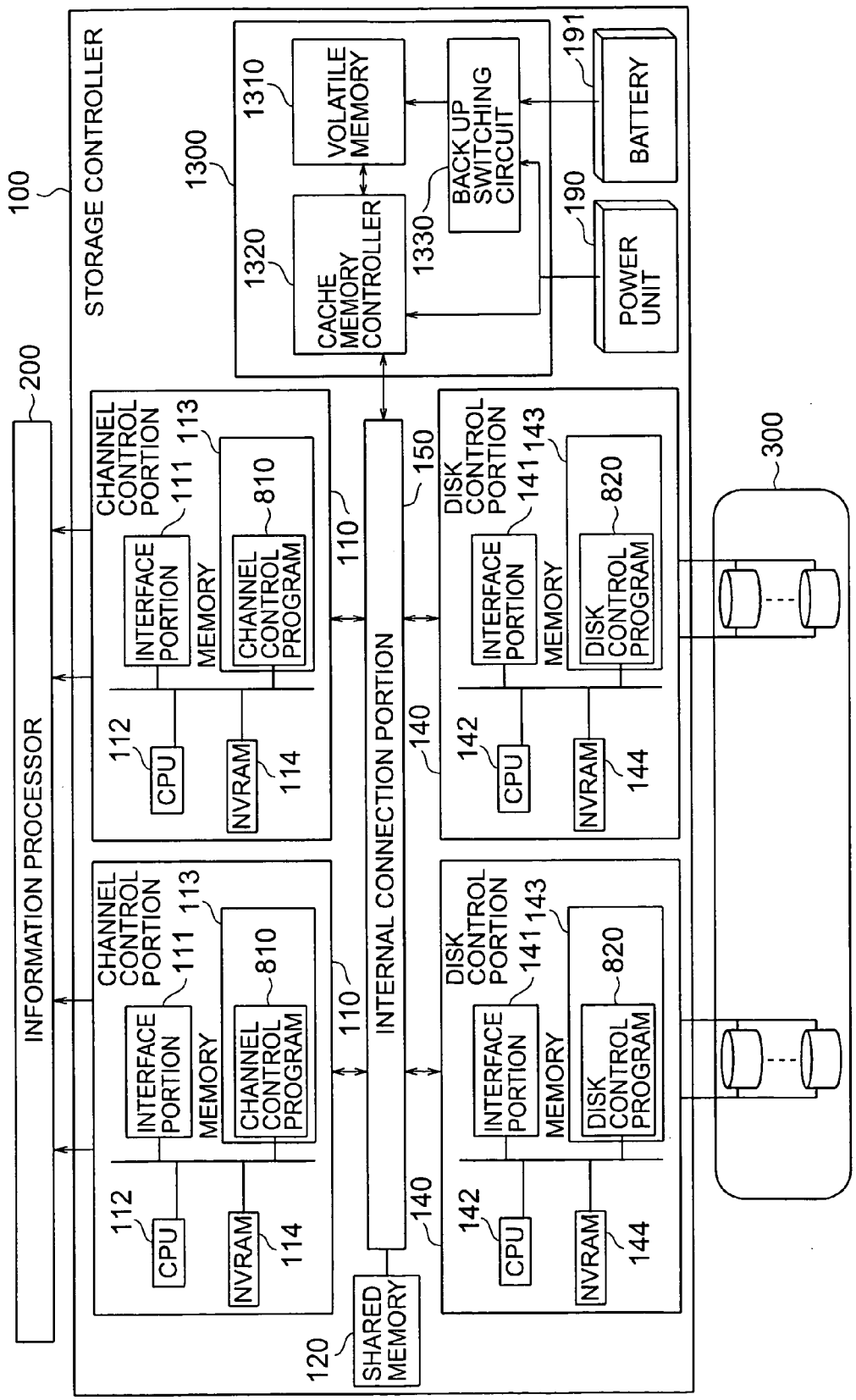
FIG. 8 is a block diagram showing a configuration of a storage controller provided with a cache memory having a nonvolatile memory.

FIG. 8 shows a configuration of the storage controller 100 when mounting a cache memory 1300 constituted by a nonvolatile memory 1310. In this case, it is necessary that the cache memory 1300 can receive power also from the battery 191 so that the data stored in the cache memory 1300 is not lost even when supply of power to the cache memory 1300 is stopped due to power failure or a trouble of the power unit 190. Therefore, the cache memory 1300 is provided with a backup switching circuit 1330 so as to be able to receive power from the battery 191 when supply of power from the power unit 190 is stopped.

The cache memory 130 constituted by a nonvolatile memory 131 is mounted on the storage controller 100 of this embodiment shown in FIG. 9 as described above.

Each channel control portion 110 and disk control portion 140 read or write data from or in the cache memory 130 through the internal connection portion 150. Moreover, each channel control portion 110 and disk control portion 140 can erase the data stored in the nonvolatile memory 131 by receiving an erase command from the control terminal 160. The data stored in the nonvolatile memory 131 is erased by rewriting the data to other data.

The cache memory 130 is provided with the nonvolatile memory 131, a cache memory controller (data erase circuit) 132, an erase control circuit (data erase circuit) 133, a mode register 134, a removal information output circuit 135, and a capacitor 136.

The nonvolatile memory 131 is constituted by, for example, a nonvolatile memory device such as a flash EEPROM. The nonvolatile memory 131 stores the data to be read from or written in a hard disk drive in accordance with a data input/output request sent from each information processor 200. The nonvolatile memory 131 can be constituted by an MRAM (Magnetic RAM), FeRAM (Ferroelectric RAM), or OUM (Ovonic Unified Memory) instead of the flash EEPROM.

The cache memory controller 132 controls read/write of data from or in the nonvolatile memory 131 in accordance with various commands (such as command for writing data in the nonvolatile memory 131, command for reading data from the nonvolatile memory 131, and command for erasing the date stored in the nonvolatile memory 131) transmitted from each channel control portion 110 or disk control portion 140. For example, when a data write command is transmitted from each channel control portion 110, the controller 132 writes the write data transmitted together with the write command in the storage address in the nonvolatile memory 131 designated by the write command. Moreover, when a data read command is transmitted from each channel control portion 110, the controller 132 reads the data quantity designated in accordance with the read command from the storage address in the nonvolatile memory 131 designated in accordance with the read command and transmits the data to the channel control portion 110. Furthermore, when a command for erasing the data stored in the nonvolatile memory 131 is transmitted from each channel control portion 110, the controller 132 erases the data stored in the nonvolatile memory 131.

Detailed operations are described below by referring to FIG. 10. The following cases are described below: a case in which a data write command is transmitted from each channel control portion 110, a case in which a data read command is transmitted from the portion 110, and a case in which a data erase command is transmitted from the portion 110. However, the same is applied to a case in which these commands are transmitted from each disk control portion 140.

First, a case is described below in which a data write command is transmitted from each channel control portion 110.

When a write command is transmitted from each channel control portion 110 receiving a data write request from each information processor 200 via the internal connection portion 150, the write command is stored in a packet buffer 2 (740) through a path-side selector circuit 720. Moreover, write data transmitted after the write command is successively stored in the packet buffer 2 (740). During the above period, a command/address analysis portion or analyzer 710 which is defined as a device which decodes the write commands stored in the packet buffer 2 (740) and specifies the type of the commands as a write command and moreover specifies addresses in which write data is written in the nonvolatile memory 131 and the write data quantity. Moreover, the information on addresses in which the write data is written and the write data quantity is sent to a memory control portion 700 from the command/address analysis portion 710. Then, the memory control portion 700 receives the addresses in which write data is written and a write enable signal from the nonvolatile memory 131 and transfers the write data stored in the packet buffer 2 (740) to the nonvolatile memory 131 via a memory-side selector circuit 730. As such, a memory-side selector is defined as a device for transferring data from the packet buffer 2 (740) to the nonvolatile memory 131 therethrough. The memory control portion or controller 700 is defined as a device which transfers the above write data while successively updating the addresses in which write data is written until all the write data is written in the nonvolatile memory 131. When all the write data is written in the nonvolatile memory 131, the portion 700 writes end status information in a status register 750, transfers the end status information to a packet buffer 1 (740) through the memory-side selector circuit 730, and transmits the information to each channel control portion 110 through the internal connection portion 150. Thereby, it is possible to write data in the nonvolatile memory 131 in accordance with a write command sent to the cache memory 130 from the channel control portion 110.

Then, a case is described in which a data read command is transmitted from each channel control portion 110.

First, when a read command is transmitted from each channel control portion 110 receiving a data read request from each information processor 200 via the internal connection portion 150, the read command is stored in the packet buffer 2 (740) through the path-side selector circuit 720. As such, the path-side selector circuit 720 is fined as a device for storing commands in the packet 2 (270) therethrough. Then, the command/address analysis portion or analyzer 710 is defined as a device which decodes the read command stored in the packet buffer 2 (740), specifies the type of commands as a read command, and moreover specifies addresses read data quantity in the nonvolatile memory 131 in which read data is stored. Moreover, the information on addresses of the read data and the read data quantity is sent to the memory control portion 700 from the command/address analysis portion 710. Then, the memory control portion 700 inputs addresses of the read data and a read enable signal to the nonvolatile memory 131. Moreover, the memory control portion 700 transfers the data read out from the nonvolatile memory 131 to the packet buffer 1 (740) through the memory-side selector circuit 730. The read data transferred to the packet buffer 1 (740) is transmitted to the channel control portions 110 through the internal connection portion 150. The memory control portion 700 transfers the above read data while successively updating addresses until all the requested data is read out from the nonvolatile memory 131. Moreover, when read of all the read data is completed, the memory control portion 700 writes end status information in the status register 750, transfers the end status information to the packet buffer 1 (740) through the memory-side selector circuit 730, and transmits the information to the channel control portions 110 through the internal connection portion 150. Thereby, it is possible to read data from the nonvolatile memory 131 in accordance with a read command to the cache memory 130 transmitted from each channel control portion 110.

Then, a case is described below in which a data erase command is transmitted from each channel control portion 110.

First, when an erase command is transmitted from the channel control portion 110 receiving the data erase command from the control terminal 160 via the internal connection portion 150, the erase command is stored in the packet buffer 2 (740) through the path-side selector circuit 720. Then, the command/address analysis portion 710 decodes the erase command stored in the packet buffer 2 (740) and specifies the type of the command as an erase command. Moreover, when the information (first address and second address) showing a range (predetermined range) for erasing data and the information showing data to be erased (other data) are included in the nonvolatile memory 131, the portion 710 also specifies these informations. Then, the information showing a range for erasing data and the information showing the data to be erased are sent to the memory control portion 700 from the command/address analysis portion 710. Then, the memory control portion 700 stores the information showing the address with which erasing starts (first address) among the information showing a range for erasing the data transmitted from the command/address analysis portion 700 in an erasing-start address register or erasing-range storage circuit 752 which is defined as a device for registering an erasing-start address, and stores the information showing the address with which erasing ends (second address) among the information showing the range in an erasing-end address register or erasing-range storage circuit 753, which is defined as a device for registering an erasing-end address. Moreover, the memory control portion 700 stores the data to be erased in an erase-data register (rewrite-data storage circuit) 751. Furthermore, the command/address analysis portion 710 writes the information showing that the data stored in the nonvolatile memory 131 should be erased in the mode register 134. When the information showing that the data stored in the nonvolatile memory 131 should be erased is written in the mode register 134, the erase control circuit 133 transmits the information showing that the data stored in the nonvolatile memory 131 should be erased to the memory control portion 700. Then, the memory control portion 700 inputs the addresses in the nonvolatile memory 131 and a write enable signal to the nonvolatile memory 131 and writes the data to be erased stored in the erase-data register 751 in the nonvolatile memory 131. Thus, the data stored in the nonvolatile memory 131 is erased. The memory control portion 700 performs the above erasing while successively updating the addresses in the nonvolatile memory 131 until the data stored in the range between the address with which erasing starts and the address with which erasing ends is completely erased. When all the data in the range is erased, the memory control portion 700 writes end status information in the status register 750, transfers the end status information to the packet buffer 1 (740) through the memory-side selector circuit 730 and transmits the information to the channel control portions 110 through the internal connection portion 150. Thereby, it is possible to erase the data in the nonvolatile memory 131 in accordance with an erase command transmitted to the cache memory 130 from each channel control portion 110.

When the information showing a range for erasing data or the information showing the data to be erased is not included in the nonvolatile memory 131, it is possible to form a configuration by hardware so that "0" is written in every storage address in the nonvolatile memory 131. In this case, it is a matter of course to form a configuration by hardware so that only the data in addresses in a predetermined range is erased. Moreover, it is possible to form a configuration by hardware so that written data is set to, for example, "1" other than "0".

It is possible to use the above predetermined range as a user area in all storage areas in the nonvolatile memory 131. In this case, the user area denotes a storage area in which data can be rewritten. By using the user area, it is possible to prevent the data used to control the cache memory 130 but it is not normally rewritten from being erroneously erased.

Figure 11:
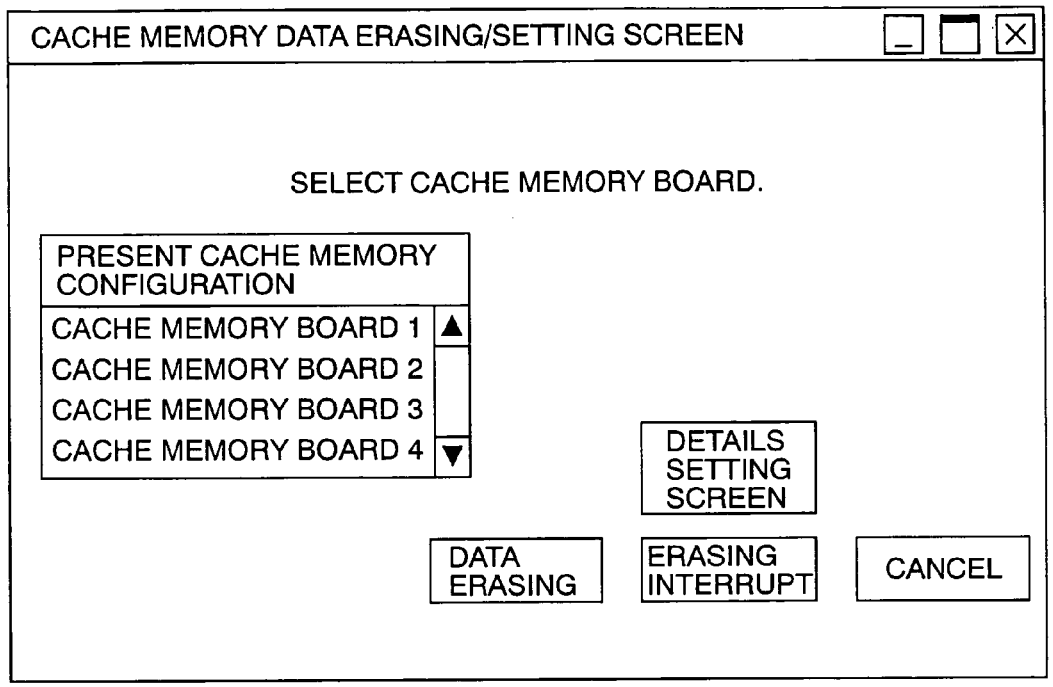
FIG. 11 is an illustration showing a setting screen for erasing the data stored in the cache memory of the present embodiment.
Figure 12:
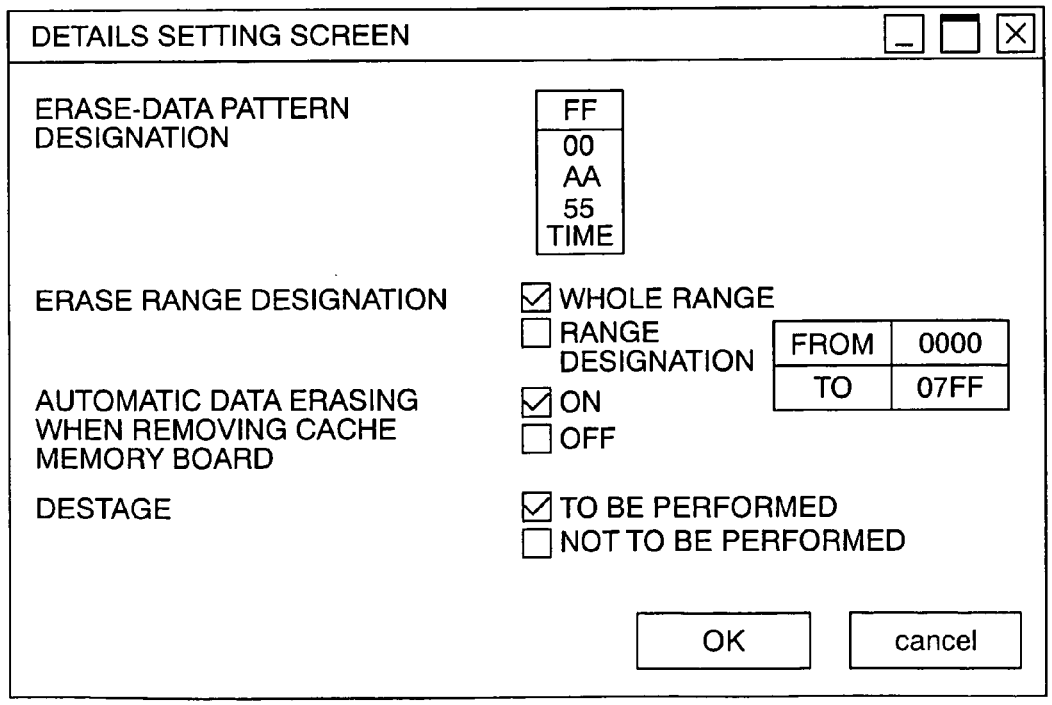
FIG. 12 is an illustration showing a setting screen for erasing the data stored in the cache memory of the present embodiment.

It is possible to designate the content of an erase command transmitted from each channel control portion 110 to the cache memory 130 by using the setting screen shown in FIG. 11 or 12 displayed on the output unit 166 of the control terminal 160.

In the setting screen shown in FIG. 11, the cache memory 130 presently set to each slot of the storage controller 100 is displayed in the space of "Present cache memory configuration". In the case of the example shown in FIG. 11, it is shown that four circuit boards of the case memory 130 are set to slots of the storage controller 100. By using a mouse for the input unit 165 and thereby putting a cursor on and clicking on the display portion showing circuit boards of the cache memory 130, it is possible to select the cache memory 130. In this case, by putting the cursor on the space of "Details setting" and clicking on the space, the details setting screen shown in FIG. 12 is displayed.

In the details setting screen, the space of "Erase-data pattern setting", the space of "Erasing-range designation", the space of "Automatic data erasing when removing cache memory board", and the space of "Stage" are displayed and it is possible to designate the content of each space.

The space of "Erase-data pattern setting" is a space for designating the data to be erased stored in the erase data register 751. In the case of the example shown in FIG. 12, it is possible to designate "FF", "00", "AA", "55", and "time".

When "FF" is selected, hexadecimal "FF" is transmitted as the data to be erased together with an erase command and written in the erase-data register 751. Moreover, to erase the data in the nonvolatile memory 131, "1" is written in each bit of the nonvolatile memory 131.

When "00" is selected, hexadecimal "00" is transmitted as the data to be erased together with an erase command and written in the erase-data register 751. Moreover, to erase the data in the nonvolatile memory 131, "0" is written in each bit of the nonvolatile memory 131.

When "AA" is selected, hexadecimal "AA" is transmitted as the data to be erased together with an erase command and written in the erase-data register 751. Moreover, to erase the data in the nonvolatile memory 131, "1" and "0" are alternately written in each bit of the nonvolatile memory 131.

When "55" is selected, hexadecimal "55" is transmitted as the data to be erased together with an erase command and written in the erase-data register 751. Moreover, to erase the data in the nonvolatile memory 131, "0" and "1" are alternately written in each bit of the nonvolatile memory 131.

When "time" is selected, the information showing the time when transmitting an erase command is transmitted as the data to be erased together with an erase command and written in the erase-data register 751. To erase the data in the nonvolatile memory 131, the information showing the time when transmitting an erase command is written in each bit of the nonvolatile memory 131. In this case, it is also possible to use the information showing the elapsed time from a certain reference time instead of the information showing the time when transmitted an erase command.

The space of "Erasing-range designation" is a space for designating the information showing the address with which erasing starts stored in the erasing-start address register 752 and the information sowing the address with which erasing ends stored in the erasing-end address register 753.

When "total range" is selected, it is possible to erase the data stored in all addresses in the nonvolatile memory 131.

When "range designation" is selected, it is possible to designate the information showing the address with which erasing starts and the information showing the address with which erasing ends in the spaces of "FROM" and "TO" respectively.

The space of "Automatic data erasing when removing cache memory board" is a space for designating whether to erase the data stored in the nonvolatile memory 131 when a circuit board with the cache memory 130 formed on it is removed from the storage controller 100 through details of the space, which will be described later.

When "ON" is selected, the information showing that "ON" is selected is set to a register 754 for determining whether to execute erasing when removing the board of the cache memory controller 132 and erasing the data stored in the nonvolatile memory 131 is started when the circuit board with the cache memory 130 formed on it is removed from the storage controller 100.

When "OFF" is selected, the information showing that "OFF" is selected is set to a register 754 for determining whether to execute erasing when removing the board of the cache memory controller 132 but erasing the data stored in the nonvolatile memory 131 is not started even when the circuit board with the cache memory 130 formed on it is removed from the storage controller 100.

The space of "Destage" is a space for designating whether to write the data unwritten in a hard disk drive among the data stored in the nonvolatile memory 131 in the hard disk drive when the data stored in the nonvolatile memory 131 is erased because an erase command is transmitted to the cache memory 130 from each channel control portion 110 or the like.

When "To be performed" is selected, the information showing that "To be performed" is selected is set to a destage advisability register 755 of the cache memory controller 132. Then, the data unwritten in a hard disk drive among the data stored in the nonvolatile memory 131 is written in the hard disk driver and then erasing the data stored in the nonvolatile memory 131 is started.

When "Not to be performed" is selected, the information showing that "Not to be performed" is selected is set to the destage advisability register 755 of the cache memory controller 132. Moreover, even when the data unwritten in a hard disk drive is present among the data stored in the nonvolatile memory 131, the data is not written in the hard disk drive but erasing the data stored in the nonvolatile memory 131 is started.

By putting the cursor of a mouse on the space of "OK" and clicking on the space, the above each set content is transmitted to the cache memory 130 from the control terminal 160 via the channel control portions 110. Moreover, each set information is stored in the erase-data register 751, erasing-start address register 752, erasing-end address register 753, register 754 for determining whether to execute erasing when removing a board, and destage advisability register 755. Then, the details setting screen shown in FIG. 12 is closed and the setting screen shown in FIG. 11 is reopened.

By putting the cursor of the mouse on the space of "Cancel" and clicking on the space, it is possible to cancel the input of each of the above set contents.

In the setting screen in FIG. 11, by putting the cursor of the mouse on the space of "Data erasing" and clicking on the space, an erase command is transmitted to the cache memory 130 from the control terminal 160 via the channel control portions 110. Thereby, erasing the data stored in the nonvolatile memory 131 is started.

Figure 13:
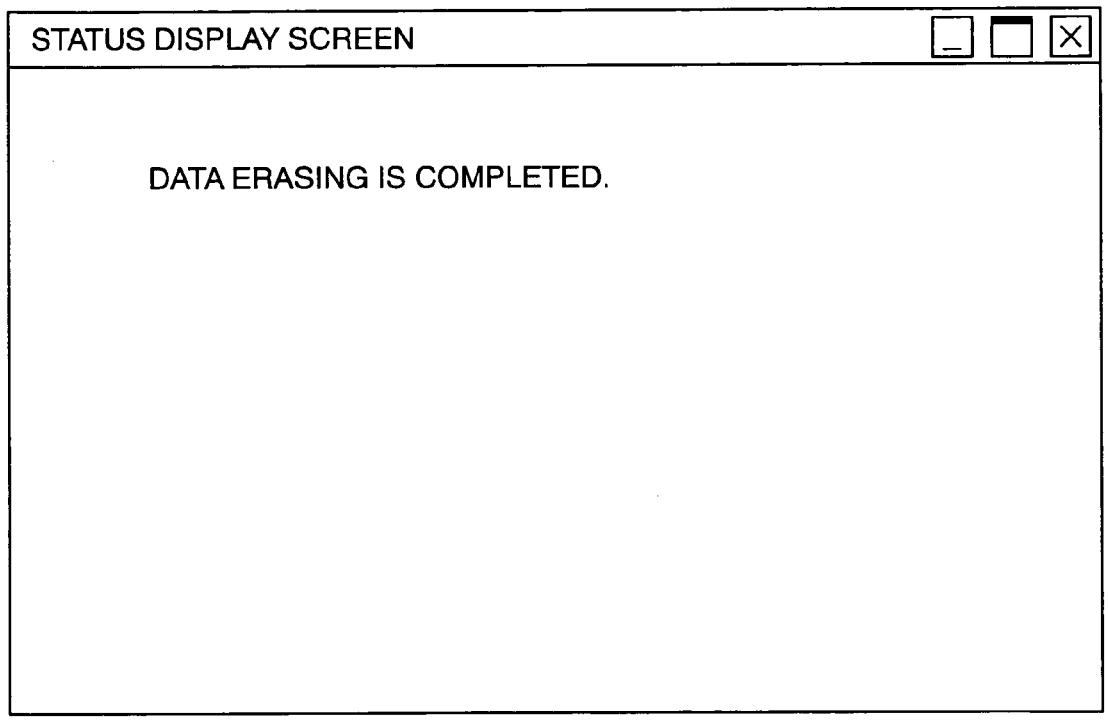
FIG. 13 is an illustration showing a message displayed when erasing of the data stored in the cache memory of the present embodiment is completed.

When erasing the data stored in the nonvolatile memory 131 is completed and an end status is transmitted from the cache memory 130 via the channel control portions 110, it is also possible to display the message shown in FIG. 13.

Moreover, in FIG. 11, by putting the cursor of the mouse on and clicking on the space of "Erasing interrupt", it is also possible to transmit an erasing interrupt command for interrupting erasing of the data stored in the nonvolatile memory 131 to the cache memory 130 via the channel control portions 110 from the control terminal 160. Thereby, it is also possible to interrupt erasing the data stored in the nonvolatile memory 131.

Figure 17:
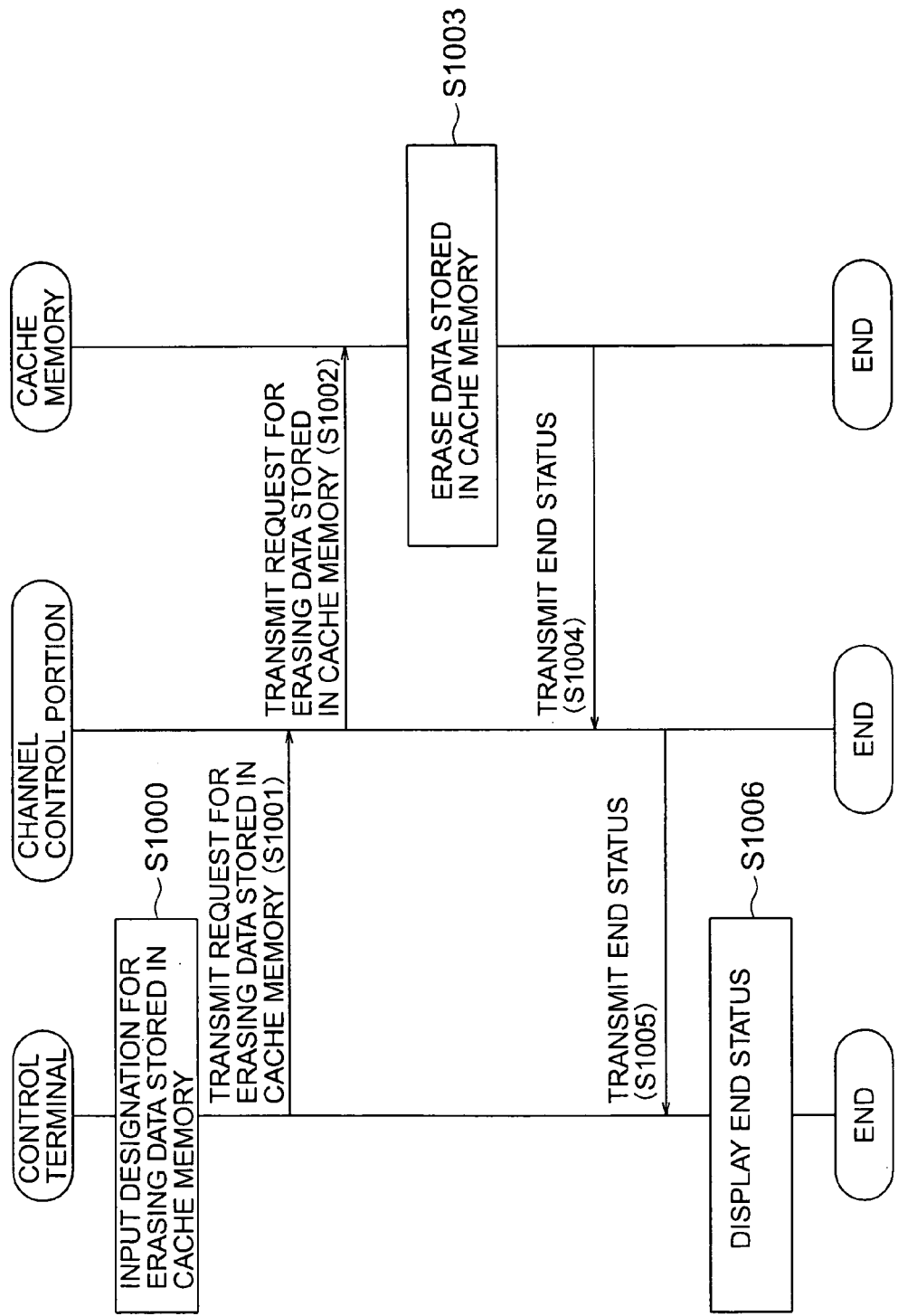
FIG. 17 is a flowchart showing the processing for erasing the data stored in the cache memory of the present embodiment.
Figure 18:
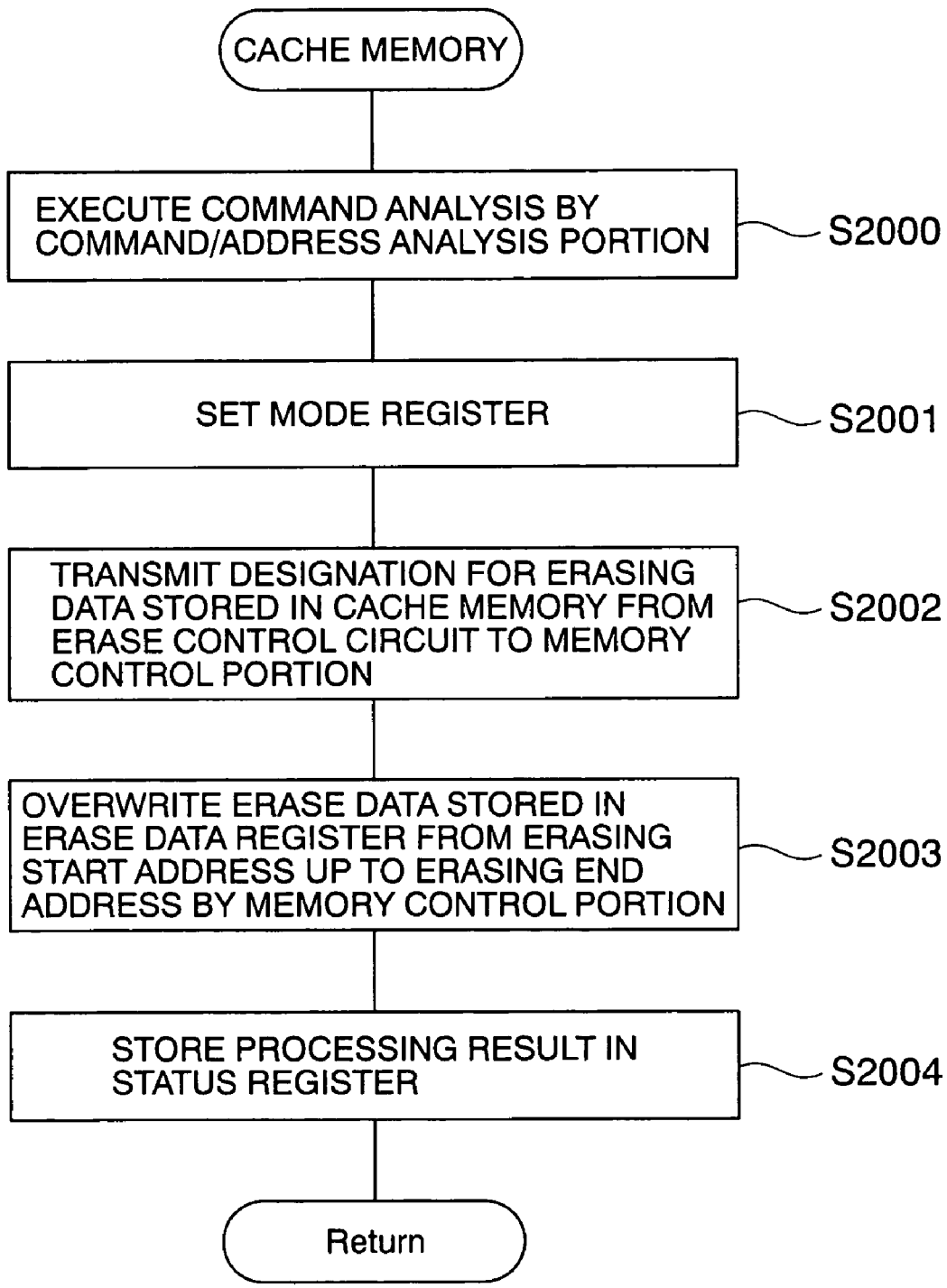
FIG. 18 is a flowchart showing the processing for erasing the data stored in the cache memory of the present embodiment.

FIGS. 17 and 18 are flowcharts showing flows of the processing for erasing the data stored in the nonvolatile memory 131 in accordance with a designation from the control terminal 160.

First, by putting the cursor of the mouse on and clicking on the space of "Data erasing" in the setting screen shown in FIG. 11, the control terminal 160 receives a designation for erasing the data stored in the cache memory 130 (S1000) and transmits an erase command to the channel control portions 110 (S1001). Then, each channel control portion 110 transmits an erase command to the cache memory 130 through the internal connection portion 150 (S1002). Moreover, the cache memory 130 starts erasing the data stored in the nonvolatile memory 131 (S1003) and when data erasing is completed, transmits end status information to the channel control portions 110 (S1004). Then, the channel control portion 110 transmits end status information to the control terminal 160 (S1005). Then, the control terminal 160 displays an end status by displaying the message shown in FIG. 13 on the output unit 166 (S1006).

In the case of the processing for erasing the data stored in the nonvolatile memory 131 in S1003, when an erase command is transmitted from each channel control portion 110 via the internal connection portion 150, the erase command is decoded by the command/address analysis portion 710 and it is specified that the type of the command is an erase command (S2000) as shown in FIG. 18. Then, the information showing that the data stored in the nonvolatile memory 131 should be erased is written in the mode register 134 from the command/address analysis portion 710 (S2001). When the information showing that the data stored in the nonvolatile memory 131 should be erased is written in the mode register 134, the information showing that the data stored in the nonvolatile memory 131 should be erased is transmitted from the erase control circuit 133 to the memory control portion 700 (S2002). Then, the memory control portion 700 inputs addresses in the nonvolatile memory 131 and a write enable signal to the nonvolatile memory 131 and rewrites the data stored in the range between the address with which erasing starts and the address with which erasing ends in accordance with the data to be erased stored in the erase-data register 751 (S2003). When the data in the whole range is rewritten, the memory control portion 700 writes end status information in the status register 750 (S2004). Then, the portion 700 executes the above processing in S1004.

For the above example, a case is described in which the erase command transmitted from the control terminal 160 is transmitted to the cache memory 130 via the channel control portions 110. However, it is also possible to transmit the erase command transmitted from the control terminal 160 to the cache memory 130 via the disk control portion 140. Moreover, it is possible to directly transmit the erase command transmitted from the control terminal 160 to the cache memory 130 not via the channel control portions 110 and the disk control portion 140.

Then, the board removal detector (removal information output circuit) 135 is described below by referring to FIG. 10 again.

The board removal detector 135 outputs the circuit board removal information showing that the circuit board of the cache memory 130 is removed from the logic board 180. According to the circuit board removal information, it is possible to detect that the circuit board of the cache memory 130 is removed from the logic board 180.

Two signals (LIDT and VIN) are input to the board removal detector 135 of this embodiment as shown in FIG. 14. Then, one signal (circuit board removal information) is output. The LIDT and VIN are connected to the power unit 190 via the logic board 180. Therefore, when the circuit board of the cache memory 130 is set to the logic board 180, voltages of the LIDT and VIN become almost equal to the output voltage of the power unit 190. Moreover, when the circuit board of the cache memory 130 is removed from the logic board 180, voltages of the LIDT and VIN become almost equal to the ground potential.

In the case of this embodiment, a pin 182 for the LIDT and a pin 183 for the VIN are different from each other in length. Specifically, as shown in FIG. 14, the pin 182 for the LIDT is made longer than the pin 183 for the VIN.

Therefore, when the circuit board of the cache memory 130 is set to the logic board 180, the pin 182 for the LIDT first contacts with a pin 138 at the circuit board of the cache memory 130 and then, the pin 183 for the VIN contacts with the pin 138 at the circuit board of the cache memory 130. However, when the circuit board of the cache memory 130 is removed from the logic board 180, the pin 183 for the VIN is first separated from the pin 138 at the circuit board of the cache memory 130 and then, the pin 182 for the LIDT is separated from the pin 138 at the circuit board of the cache memory 130.

Figure 15:
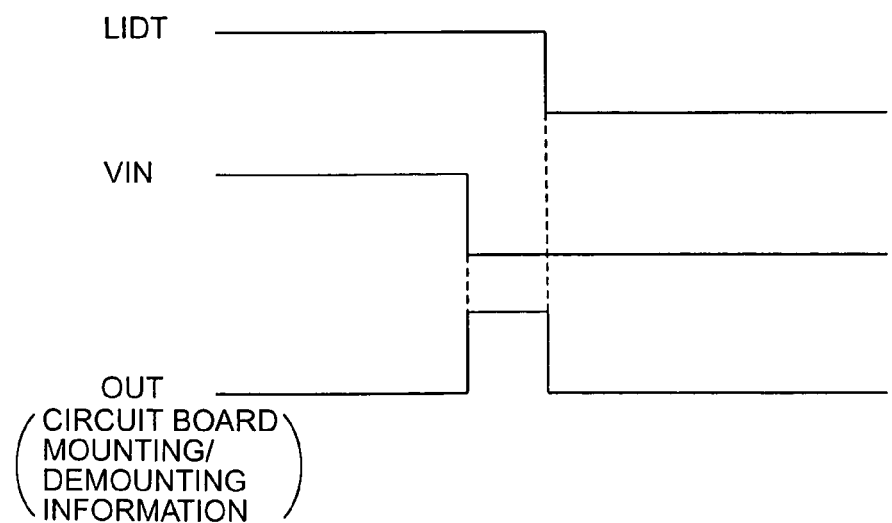
FIG. 15 is an illustration showing a state in which the circuit board removal information in the present embodiment is output.

By constituting the board removal detector 135 by a circuit for computing the exclusive OR between the LIDT and VIN and outputting the computing result as circuit board removal information, it is possible to output a pulsed signal showing that the circuit board of the cache memory 130 is removed from the logic board 180, as circuit board removal information as shown in FIG. 15.

The circuit board removal information is not restricted to the above example. For example, it is possible to directly output one of the LIDT and VIN signals as the circuit board removal information by inputting only one of the LIDT and VIN signals to the bard removal detector 135. In this case, when the voltage of the signal of the circuit board removal information is almost equal to the output voltage of the power unit 190, it is possible to detect that the circuit board of the cache memory 130 is set to the logic board 180 and when the voltage of the signal of the circuit board removal information is almost equal to the ground potential, it is possible to detect that the circuit board of the cache memory 130 is removed from the logic board 180.

Moreover, by detecting the conductivity (electrical resistance) between the LIDT and VIN, it is possible to detect that the circuit board of the cache memory 130 is removed from the logic board 180. In this case, it is not always necessary that the LIDT and VIN are connected with the power unit 180 in FIG. 14.

Thus, the circuit board removal information is input to the erase control circuit 133. FIG. 19 shows a flow of the processing when the circuit board removal information showing that the circuit board of the cache memory 130 is removed from the logic board 180 is output from the board removal detector 135.

When the circuit board removal information showing that the circuit board of the cache memory 130 is removed from the logic board 180 is output from the board removal detector 135 (S3000), the erase control circuit 133 transmits the information showing that the data in the nonvolatile memory 131 should be erased to the memory control portion 700 when it is stored in the register 754 for determining whether to erase the data stored in the nonvolatile memory 131 that the data stored in the nonvolatile memory 131 can be erased (S3001). Then, the memory control portion 700 inputs addresses in the nonvolatile memory 131 and a write enable signal to the nonvolatile memory 131 and starts writing the data to be erased stored in the erase-data register 751 in the nonvolatile memory 131 (S3001). Then, the memory control portion 700 rewrites the data stored in the range between the address with which erasing starts and the address with which erasing ends stored in the erasing-start address register 752 and the erasing-end address register 753 while successively updating the addresses in the nonvolatile memory 131 until ending rewriting with the data to be erased. When the data in the whole range is written to the data to be erased, the memory control portion 700 writes end status information in the status register 750 (S3003). Moreover, the memory control portion 700 transfers the end status information to the packet buffer 1 (740) through the memory-side selector circuit 730. However, because the circuit board of the cache memory 130 is already removed from the logic board 180, the end status information transferred to the packet buffer 1 (740) is not transmitted to the channel control portions 110. Thus, when the circuit board of the cache memory 130 is removed from the logic board 180, it is possible to erase the data stored in the nonvolatile memory 131.

When the circuit board of the cache memory 130 is removed from the logic board 180, the power supply route from the power unit 190 is cut off. Therefore, the circuit board of the cache memory 130 of this embodiment is provided with a power storage circuit for storing the power to be used in the circuit board after the circuit board is removed from the logic board 180. The power storage circuit can use the capacitor 136 as shown in FIG. 10. The capacitor 136 stores the power supplied from the power unit 190 while the circuit board of the cache memory 130 is set to the logic board 180. Moreover, when the circuit board of the cache memory 130 is removed from the logic board 180, the power stored in the capacitor 136 is supplied to the cache memory controller 132 and each circuit in circuit boards of the nonvolatile memory 131 and the like. Thereby, even after the circuit board of the cache memory 130 is removed from the logic board 180 and the power supply route to the circuit board from the power unit 190 is cut off, it is possible to erase the data stored in the nonvolatile memory 131.

Figure 16:
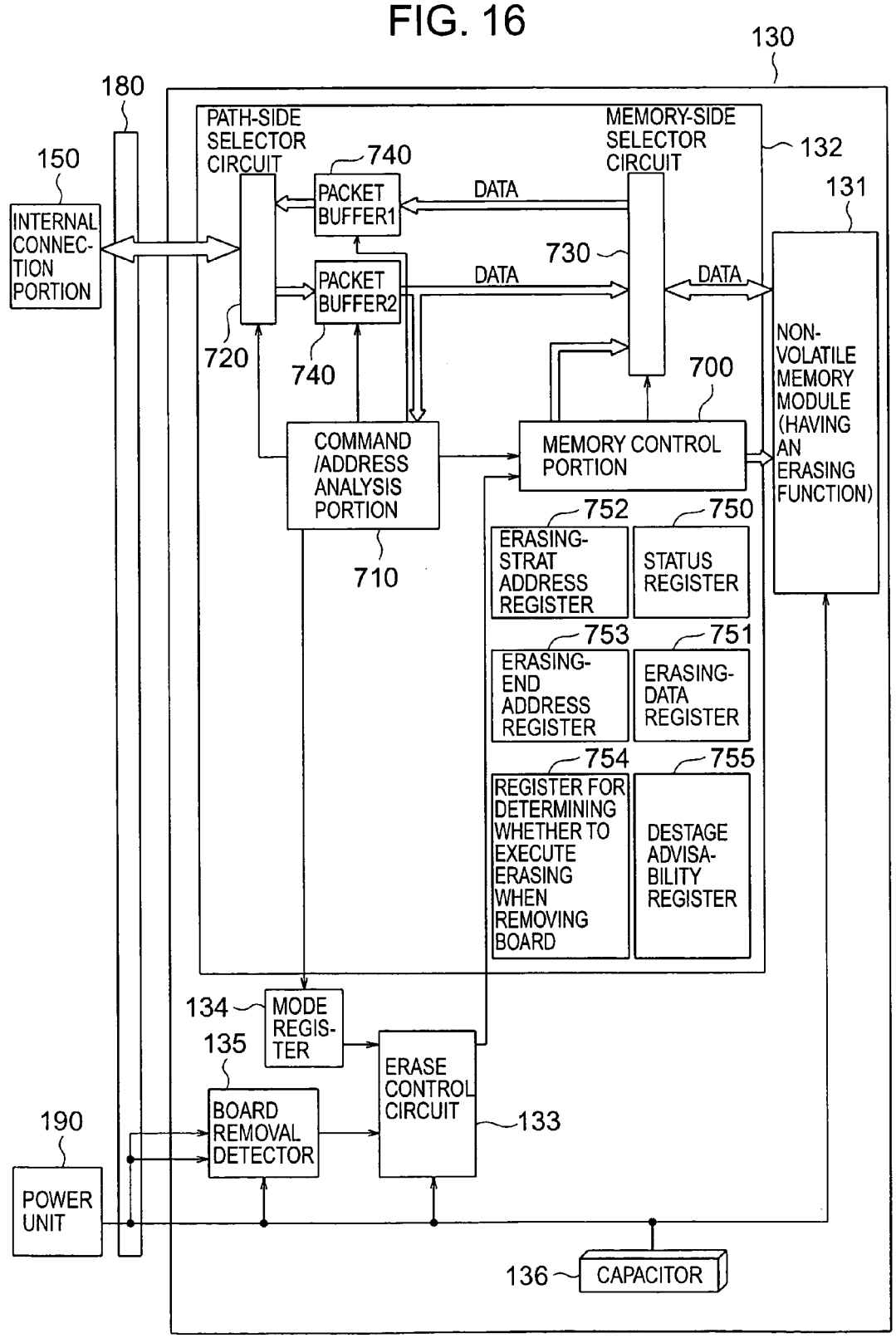
FIG. 16 is a block diagram showing a configuration of the storage controller of the present embodiment.

For the nonvolatile memory 131 of this embodiment, it is possible to use a memory having a function for receiving the input of a memory erase request signal for erasing the data stored in the nonvolatile memory 131 and erasing the data stored in the nonvolatile memory 131 when the memory erase request signal is input. FIG. 16 shows a configuration of the storage controller 100 in the above case.

In this case, by inputting the above memory erase request signal to the nonvolatile memory 131 from the memory control portion 700, it is possible to erase the data stored in the nonvolatile memory 131. A memory erase request signal input to the nonvolatile memory 131 is specified as a product specification of the nonvolatile memory 131.

The storage controller 100 of this embodiment is described above. According to this embodiment, when constituting the cache memory 130 by using the nonvolatile memory 131, it is possible to realize the security protection of the data stored in the cache memory 130. For example, even when the cache memory 130 is removed from the storage controller 100 and brought out by an illegal person, it is possible to prevent the data stored in the cache memory 131 from being known by a third party and secret from leaking. Moreover, when the storage controller 100 or the cache memory 130 is scrapped, it is possible to prevent the data stored in the cache memory 130 from being known by a third party through a scrapper and secret from leaking.

For this embodiment, a case is described in which the data stored in the cache memory 130 in the storage controller 100 is erased. However, it is also possible to apply the present invention to the case of erasing the data stored in the NVRAM 144 of each channel control portion 110 or the NVRAM 144 of the disk control portion 140.

Moreover, it is possible to widely apply the present invention to general information processors respectively provided with a nonvolatile memory in addition to the storage controller 100. Furthermore, it is possible to apply the present invention to an information processor provided with a nonvolatile memory such as a computer, telephone set, copying machine, facsimile transceiver, printer, POS (Point Of Sales system) terminal, IC (Integrated Circuit) recorder, DVD (Digital Versatile Disk) recorder, HDD (Hard Disk Drive) recorder, MD (Mini Disk), transcription machine, audiovisual system such as a television receiver or videocamera, or PDA (Personal Digital Assistant) terminal.

The preferred embodiment of the present invention is described above. However, the above-described embodiment is illustrative but not restrictive. It is possible to modify or improve the present invention without deviating from its purport and moreover, the present invention includes its equivalents.

The disclosure of Japanese Patent Application No. 2004-030825 filed on Feb. 6, 2004 including specification, drawings and claims is incorporated herein by reference in its entirety.

What is claimed is:

1. A storage controller for receiving a data input/output request from an information processor and reading or writing data from or in a hard disk drive in accordance with the data input/output request, comprising:
    a circuit board provided with a nonvolatile memory functioning as a cache memory for storing the data to be read from or written in the hard disk drive; and
    a circuit board setting portion to which the circuit board is removably set; wherein
        the circuit board is provided with a removal information output circuit for outputting circuit-board removal information showing that the circuit board is removed from the circuit board setting portion and
        a data erase circuit for erasing the data stored in the nonvolatile memory when the circuit board removal information is output from the removal information output circuit.

2. The storage controller according to claim 1, wherein the data erase circuit erases the data stored in a predetermined range of the nonvolatile memory when the circuit board removal information is output from the removal information output circuit.

3. The storage controller according to claim 2, wherein the circuit board is provided with an erasing-range storage circuit for storing a first address and a second address in the address space of the nonvolatile memory, and the data erase circuit erases the data stored in the range by erasing the data stored in the range between the first address and the second address.

4. The storage controller according to claim 1, wherein the data erase circuit erases the data stored in the nonvolatile memory by rewriting the data stored in the nonvolatile memory to other data.

5. The storage controller according to claim 4, wherein the circuit board is provided with a rewritten data storage circuit for storing the other data, and
the data erase circuit erases the data stored in the nonvolatile memory by rewriting the data stored in the nonvolatile memory to the other data stored in the rewritten data storage circuit when the circuit board removal information is output from the removal information output circuit.

6. The storage controller according to claim 1, wherein the nonvolatile memory has a function for erasing the data stored in the nonvolatile memory when a memory-erasing-request signal for erasing the data stored in the nonvolatile memory is input, and
the data erase circuit erases the data stored in the nonvolatile memory by inputting the memory-erasing-request signal to the nonvolatile memory when the circuit board removal information is output from the removal information output circuit.

7. A control method of a storage controller for receiving a data input/output request from an information processor and reading or writing data from or in a hard disk drive in accordance with the data input/output request and provided with a circuit board including a nonvolatile memory functioning as a cache memory for storing the data to be read from or written in the hard disk drive and a circuit board setting portion to which the circuit board is removably set, in which the circuit board is provided with a removal information output circuit for outputting circuit board removal information showing that the circuit board is removed from the circuit board setting portion, comprising:
a step of erasing the data stored in the nonvolatile memory when the circuit board removal information is output from the removal information output circuit.

8. The control method of a storage controller according to claim 7, wherein
the data stored in a predetermined range of the nonvolatile memory is erased when the circuit board removal information is output from the removal information output circuit.

9. The control method of a storage controller according to claim 8, wherein
the circuit board is provided with an erasing range storage circuit for storing a first address and a second address in the address space of the nonvolatile memory, and
the data stored in the range is erased by erasing the data stored in the range between the first address and the second address.

10. The control method of a storage controller according to claim 7, wherein
the data stored in the nonvolatile memory is erased by rewriting the data stored in the nonvolatile memory to other data.

11. The control method of a storage controller according to claim 10, wherein
the circuit board is provided with a rewritten data storage circuit for storing the other data, and
the data stored in the nonvolatile memory is erased by rewriting the data stored in the nonvolatile memory to the other data stored in the rewritten data storage circuit.

12. The control method of a storage controller according to claim 7, wherein
the nonvolatile memory has a function for erasing the data stored in the nonvolatile memory when a memory erasing request signal for erasing the data stored in the nonvolatile memory is input, and
the data stored in the nonvolatile memory is erased by inputting the memory-erasing-request signal to the nonvolatile memory.

13. A storage controller comprising:
a first circuit board on which a channel control portion for receiving a data input/output request from an information processor and outputting an I/O request corresponding to the data input/output request is formed;
a second circuit board on which a shared memory in which the I/O request is stored is formed;
a third circuit board on which a disk control portion for reading or writing data from or in a hard disk drive in accordance with the I/O request stored in the shared memory is formed;
a fourth circuit board having a nonvolatile memory functioning as a cache memory for storing the data transferred between the channel control portion and the disk control portion and stored in the hard disk drive; and
a circuit board setting portion to which the first circuit board, the second circuit board, the third circuit board, and the fourth circuit board are removably set; wherein
the fourth circuit board is provided with
a removal information output circuit for outputting circuit board removal information showing that the fourth circuit board is removed from the circuit board setting portion, and
a data erase circuit for erasing the data stored in the nonvolatile memory when the circuit board removal information is output from the removal information output circuit.

* * * * *